(12) United States Patent
Nam et al.

(10) Patent No.: US 11,169,953 B2
(45) Date of Patent: Nov. 9, 2021

(54) DATA PROCESSING SYSTEM ACCESSING SHARED MEMORY BY USING MAILBOX

(71) Applicant: SK hynix Inc., Icheon-si (KR)

(72) Inventors: Ji Hoon Nam, Icheon-si (KR); Eui Cheol Lim, Icheon-si (KR)

(73) Assignee: SK hynix inc., Icheon-si (KR)

( * ) Notice: Subject to any disclaimer, the term of this patent is extended or adjusted under 35 U.S.C. 154(b) by 125 days.

(21) Appl. No.: 16/210,418

(22) Filed: Dec. 5, 2018

(65) Prior Publication Data

US 2019/0266123 A1    Aug. 29, 2019

(30) Foreign Application Priority Data

Feb. 28, 2018  (KR) .................... 10-2018-0024836
Mar. 20, 2018  (KR) .................... 10-2018-0032111

(51) Int. Cl.
| | |
|---|---|
| *G06F 12/1072* | (2016.01) |
| *G06F 9/54* | (2006.01) |
| *G06F 9/48* | (2006.01) |
| *G06F 15/167* | (2006.01) |

(52) U.S. Cl.
CPC .......... *G06F 15/167* (2013.01); *G06F 9/4843* (2013.01); *G06F 9/544* (2013.01); *G06F 12/1072* (2013.01)

(58) Field of Classification Search
CPC ..... G06F 12/1072; G06F 9/544; G06F 9/4843
See application file for complete search history.

(56) References Cited

U.S. PATENT DOCUMENTS

| | | | | |
|---|---|---|---|---|
| 2008/0170460 | A1* | 7/2008 | Oh ........................... | G11C 8/12 365/230.05 |
| 2009/0157977 | A1* | 6/2009 | Gregg ................. | G06F 12/0835 711/141 |
| 2009/0313440 | A1* | 12/2009 | Kim ....................... | G06F 9/544 711/149 |

FOREIGN PATENT DOCUMENTS

| | | | |
|---|---|---|---|
| KR | 1019960005253 | A | 2/1996 |
| KR | 101153712 | B1 | 7/2012 |

* cited by examiner

*Primary Examiner* — Michelle T Bechtold
(74) *Attorney, Agent, or Firm* — William Park & Associates Ltd.

(57) ABSTRACT

A data processing system including a shared memory; a host processor configured to possess an ownership of the shared memory, and process a first task by accessing the shared memory; a processor configured to possess the ownership transferred from the host processor, and process a second task by accessing the shared memory; and a memory controller coupled among the host processor, the processor, and the shared memory, and configured to allow the host processor or the processor to access the shared memory according to the ownership.

25 Claims, 19 Drawing Sheets

DATA PROCESSING SYSTEM ACCESSING SHARED MEMORY BY USING MAILBOX

CROSS-REFERENCES TO RELATED APPLICATION

The present application claims priority under 35 U.S.C. § 119(a) to Korean application number 10-2018-0024836, filed on Feb. 28, 2018, and Korean application number 10-2018-0032111, filed on Mar. 20, 2018, in the Korean Intellectual Property Office, which is incorporated herein by reference in its entirety.

BACKGROUND

1. Technical Field

Various embodiments generally relate to a data processing system, and more particularly, to a data processing system including a shared memory.

2. Related Art

A data processing system is an electronic system capable of processing data, and may include a personal computer, laptop computer, smart phone, tablet computer, digital camera, game console, navigation system, virtual reality (VR) device, wearable device and the like.

The data processing system may include a memory system. The memory system may be configured to store data processed by the data processing system. The memory system may be embedded in the data processing system, or separately fabricated and connected to the data processing system. The memory system may include a PCMCIA (Personal Computer Memory Card International Association) card, CF (Compact Hash) card, smart media card, memory stick, various multimedia cards (MMC, eMMC, RS-MMC and MMC-micro), SD (Secure Digital) card (SD, Mini-SD, Micro-SD), UFS (Universal Flash Storage) or SSD (Solid State Drive).

SUMMARY

In an embodiment, a data processing system may include: a shared memory; a host processor configured to possess an ownership of the shared memory, and process a first task by accessing the shared memory; a processor configured to possess the ownership transferred from the host processor, and process a second task by accessing the shared memory; and a memory controller coupled among the host processor, the processor, and the shared memory, and the memory controller configured to allow the host processor or the processor to access the shared memory according to the ownership. The memory controller may include a mail box, and the host processor may transfer or restore the ownership by accessing the mail box.

In an embodiment, a data processing system may include: a shared memory; a processor configured to process a task by receiving an ownership from a host processor and accessing the shared memory; and a memory controller coupled among the host processor, the processor, and the shared memory, and configured to allow the host processor or the processor to access the shared memory according to the ownership. The memory controller may include a mail box which the host processor accesses in order to transfer the ownership to the processor.

In an embodiment, a data processing system may include: a status storage unit configured to store a value of a remaining throughput corresponding to a task; a first processor configured to read the value of the remaining throughput from the status storage unit at each check timing based on a check period; and a second processor configured to process the task, wherein the first processor calculates a check period throughput value based on a current remaining throughput value corresponding to a current check timing and a previous remaining throughput value corresponding to a previous check timing, and adjusts the check period based on the current remaining throughput value and the check period throughput value.

In an embodiment, an operating method of a data processing system may include: reading, by a first processor, remaining throughput of a task from a status storage unit at each check timing based on a check period; calculating, by the first processor, check period throughput based on a current remaining throughput of a current check timing and a previous remaining throughput of previous check timing; and adjusting, by the first processor, the check period based on the current remaining throughput and the check period throughput.

In an embodiment, a data processing system may include: a shared memory; a host processor configured to possess an ownership of the shared memory, and process a first task by accessing the shared memory; a processor configured to possess the ownership transferred from the host processor, and process a second task by accessing the shared memory; and a memory controller coupled among the host processor, the processor, and the shared memory, and configured to allow the host processor or the processor to access the shared memory according to the ownership. Possession of the ownership may be determined by the memory controller based on an address of an access command received from the host processor and whether the address of the access command is within a first address range or a second address range.

In an embodiment, a data processing system may include: a shared memory; a processor configured to process a task by receiving an ownership from a host processor and accessing the shared memory; and a memory controller coupled among the host processor, the processor, and the shared memory, and configured to allow the host processor or the processor to access the shared memory according to the ownership. Access to the shared memory may be determined by the memory controller based on an address of an access command received from the host processor and whether the address of the access command is within a first address range or a second address range.

DETAILED DESCRIPTION

Figure 1:
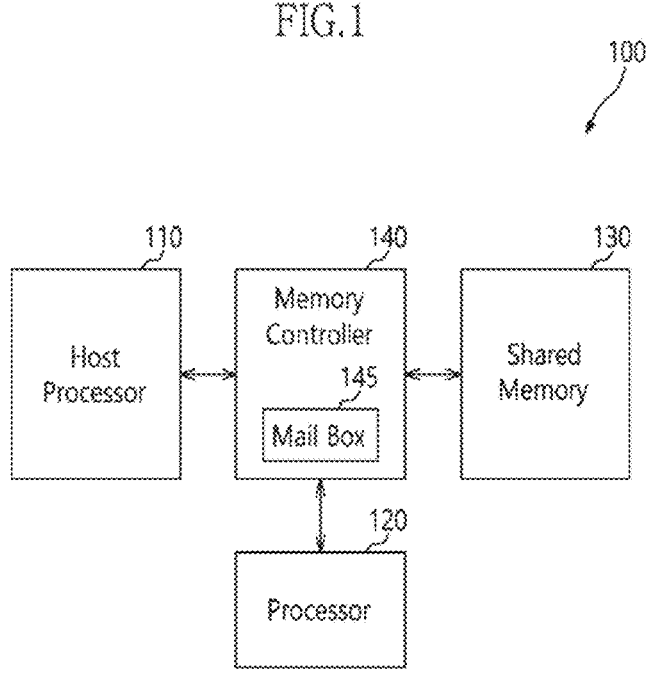
FIG. 1 is a block diagram illustrating a data processing system in accordance with an embodiment.

The advantages and characteristics of the present disclosure and a method for achieving the advantages and characteristics will be described through the following embodiments with reference to the accompanying drawings. However, the present disclosure is not limited to the embodiments described herein, but may be embodied in different manners. The present embodiments are only provided to describe the present disclosure, such that the technical idea of the present disclosure can be easily carried out by those skilled in the art to which the present disclosure pertains.

The embodiments are not limited to specific shapes illustrated in the drawings, but may be exaggerated for clarity. In this specification, specific terms are used. However, the terms are only used to describe the present disclosure, but do not limit the scope of the present disclosure, described in claims.

In this specification, an expression such as 'and/or' may indicate including one or more of components listed before/after the expression. Moreover, an expression such as 'connected/coupled' may indicate that one element is directly connected/coupled to another element or indirectly connected/coupled through still another element. The terms of a singular form may include plural forms unless referred to the contrary. Furthermore, the meanings of 'include' and 'comprise' or 'including' and 'comprising' may specify a component, step, operation and element, but do not exclude one or more other components, steps, operations and elements.

Hereafter, examples of embodiments of the present disclosure will be described with reference to the drawings.

FIG. 1 is a block diagram illustrating a data processing system 100 in accordance with an embodiment.

Referring to FIG. 1, the data processing system 100 may include a host processor 110, a processor 120, a shared memory 130 and a memory controller 140.

The host processor 110 may control overall operations of the data processing system 100. The host processor 110 may have an ownership of the shared memory 130, and process a task by accessing the shared memory 130. The host processor 110 may transfer the ownership to the processor 120, while instructing the processor 120 to process the task.

The processor 120 may process the task indicated by the host processor 110. The processor 120 may receive the ownership from the host processor 110, and process the task by accessing the shared memory 130. In a present embodiment, the ownership may indicate an authority with which the host processor 110 and the processor 120 can exclusively access the shared memory 130 without conflict. The host processor 110 and the processor 120 may access the shared memory 130 through the memory controller 140.

After transferring the ownership to the processor 120, the host processor 110 may check the status information of the processor 120 from the memory controller 140. When it is determined that the processor 120 has completed the task, the host processor 110 may restore the ownership from the processor 120 and possess the ownership. After possessing the ownership, the host processor 110 may read task result data of the processor 120 from the shared memory 130.

As described above, the access to the shared memory 130 may be limited, depending on which one of the host processor 110 and the processor 120 possesses the ownership. In order to implement such a configuration, the memory controller 140 may give the ownership to any one of the host processor 110 and the processor 120. The memory controller 140 may change a path for the shared memory 130 while giving the ownership to any one of the host processor 110 and the processor 120 according to control of the host processor 110. The host processor 110 may transmit a predetermined command to the memory controller 140 in order to change the ownership of the shared memory 130 by transferring the ownership to the processor 120 or restoring the ownership from the processor 120.

The word "predetermined" as used herein with respect to a parameter, such as a predetermined command, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The host processor 110 and the processor 120 may include a central processing unit (CPU), graphic processing unit (GPU), microprocessor, application processor, accelerated processing unit, operating system and the like.

The shared memory 130 may be shared by the host processor 110 and the processor 120. The shared memory 130 may be accessed through the memory controller 140 by any one processor which possesses the ownership, between the host processor 110 and the processor 120.

The memory controller 140 may be connected among the host processor 110, the processor 120 and the shared memory 130. The memory controller 140 may give the ownership to any one of the host processor 110 and the processor 120 according to control of the host processor 110, and thus allow the host processor 110 or the processor 120 to access the shared memory 130. In order to give the ownership to any one of the host processor 110 and the processor 120, the memory controller 140 may selectively enable a data path and command path among the host processor 110, the processor 120 and the shared memory 130. The memory controller 140 may change the ownership of the shared memory 130 between the host processor 110 and the processor 120, in response to a predetermined command transmitted from the host processor 110.

The memory controller 140 may include a mail box 145. The host processor 110 may transfer or restore the ownership to or from the processor 120 by accessing the mail box 145. The host processor 110 may store task information, which the processor 120 needs to check, in the mail box 145. The host processor 110 may read the status information of the processor 120 from the mail box 145.

The processor 120 may read task information form the mail box 145, and check the read task information to process the task indicated by the host processor 110.

The mail box 145 may include various memory elements such as an SRAM, register, and the like.

In short, the memory controller 140 may give the ownership to any one of the host processor 110 and the processor 120 according to control of the host processor 110, and allow only the processor with the ownership to access the shared memory 130. Therefore, the host processor 110 and the processor 120 can process a task using the shared memory 130 without conflict. The shared memory 130 may have an interface based on an existing protocol or pin arrangement.

Figure 2:
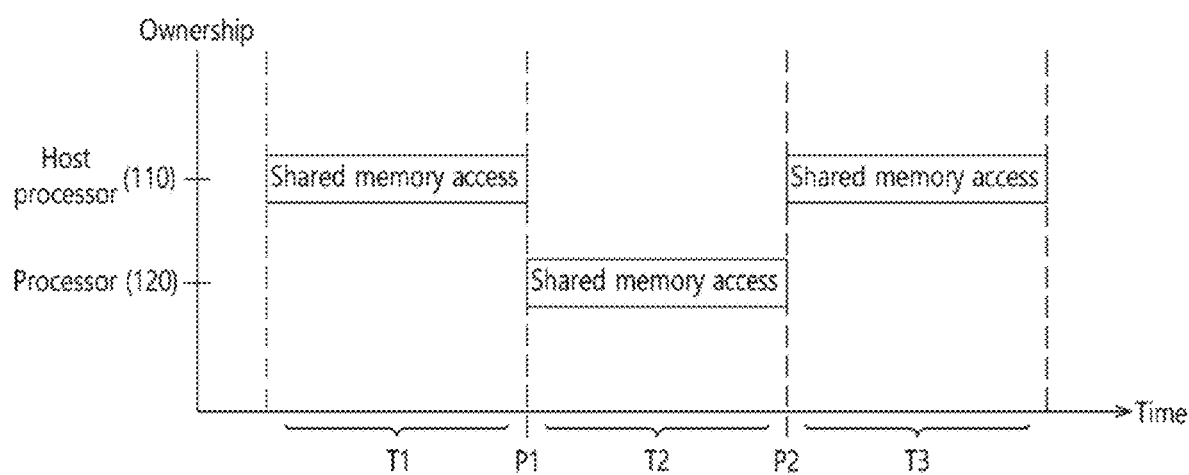
FIG. 2 illustrates that a host processor and a processor alternately possess an ownership of a shared memory in accordance with the present embodiments.

FIG. 2 illustrates that the host processor 110 and the processor 120 alternately possess the ownership of the shared memory 130, in accordance with a present embodiment.

Referring to FIG. 2, the host processor 110 may possess the ownership at first. Therefore, during time T1, the host processor 110 may possess the ownership, and access the shared memory 130 to process a task. During time T1, the processor 120 cannot access the shared memory 130.

At point P1, the host processor 110 may transfer the ownership to the processor 120. Therefore, during time T2, the processor 120 may possess the ownership and access the shared memory 130 to process a task. During time T2, the host processor 110 cannot access the shared memory 130.

At point P2, the host processor 110 may restore the ownership from the processor 120. Therefore, during time T3, the host processor 110 may possess the ownership and access the shared memory 130 to process a task. During time T3, the processor 120 cannot access the shared memory 130.

In an embodiment, the task of the host processor 110, processed during time T1, may include storing task data in the shared memory 130, the task data indicating data which the processor 120 is instructed to process. The task of the processor 120, processed during time T2, may include processing the task data stored in the shared memory 130 according to an instruction of the host processor 110. The task of the host processor 110, processed during time T3, may include reading the task result data of the processor 120 from the shared memory 130. The corresponding procedure will be described with reference to FIG. 3 below.

Figure 3:
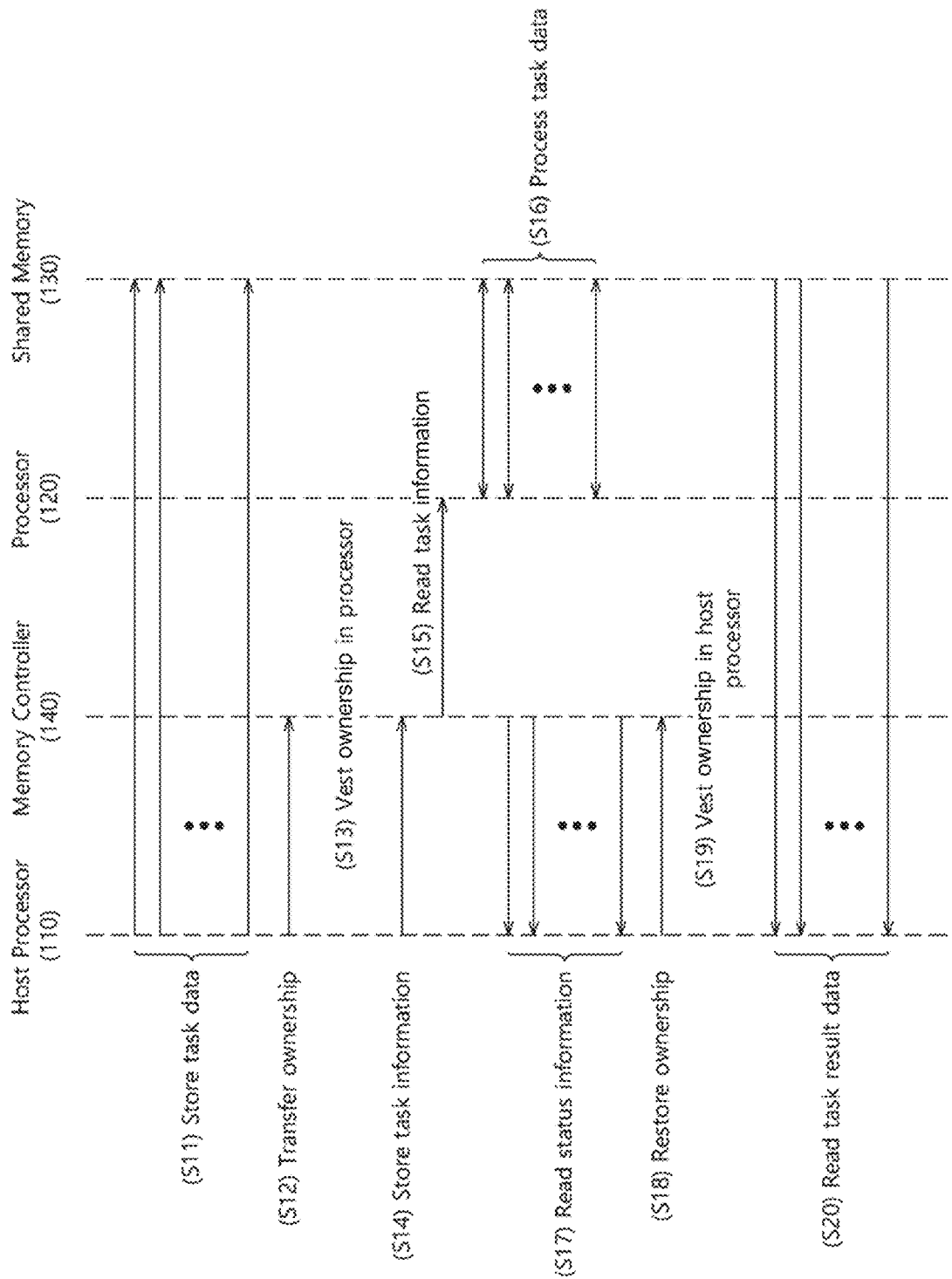
FIG. 3 briefly illustrates an operation procedure of the host processor and the processor in accordance with the present embodiments.

FIG. 3 briefly illustrates the operation procedure of the host processor 110 and the processor 120 in accordance with a present embodiment. When the procedure of FIG. 3 is started, the ownership may be possessed by the host processor 110.

Referring to FIG. 3, the host processor 110 may store task data in the shared memory 130, the task data indicating data which the processor 120 needs to process, at step S11. Since the host processor 110 possesses the ownership, the host processor 110 can access the shared memory 130. The host processor 110 might not directly access the shared memory 130, but access the shared memory 130 substantially through the memory controller 140. At step S11, an arrow connected from the host processor 110 to the shared memory 130 may indicate that the host processor 110 has the ownership to use the shared memory 130.

At step S12, the host processor 110 may transmit a predetermined command to the memory controller 140 in order to transfer the ownership to the processor 120.

At step S13, the memory controller 140 may give the ownership to the processor 120 in response to the command transmitted from the host processor 110. Therefore, the memory controller 140 may allow only the processor 120 to access the shared memory 130.

At step S14, the host processor 110 may store task information in the mail box 145 of the memory controller 140. The task information may include information on a task which the processor 120 needs to process. For example, the task information may include the start address and the end address of the region where the task data is stored in the shared memory 130. The task information may include the start address and the end address of the area where the task result data needs to be stored in the shared memory 130.

At step S15, the processor 120 may read the task information stored in the mail box 145.

At step S16, the processor 120 may process the task data stored in the shared memory 130. The processor 120 may read the task data from the shared memory 130, process the read data, and store the processed data as task result data in the shared memory 130. Since the processor 120 possesses the ownership, the processor 120 can access the shared memory 130. The processor 120 might not directly access the shared memory 130, but access the shared memory 130 substantially through the memory controller 140. At step S16, an arrow connected from the processor 120 to the shared memory 130 may indicate that the processor 120 has the ownership to use the shared memory 130.

At step S17, the host processor 110 may repeatedly read the status information of the processor 120 through the mail box 145 of the memory controller 140. The status information may include information on whether the processor 120 has completed the task. The status information may include remaining throughput of the task which the processor 120 is processing. Step S17 may be performed in parallel to step S16. As described below, when the processor 120 possesses the ownership, the host processor 110 can access the mail box 145.

At step S18, when it is determined that the processor 120 has completed the task, the host processor 110 may transmit a predetermined command to the memory controller 140 in order to restore the ownership from the processor 120.

At step S19, the memory controller 140 may give the ownership to the host processor 110 in response to the command transmitted from the host processor 110. Therefore, the memory controller 140 may allow only the host processor 110 to access the shared memory 130.

At step S20, the host processor 110 may read the task result data of the processor 120 from the shared memory 130. Since the host processor 110 possesses the ownership, the host processor 110 can access the shared memory 130. The host processor 110 might not directly access the shared memory 130, but access the shared memory 130 substantially through the memory controller 140. At step S11, an arrow connected from the host processor 110 to the shared memory 130 may indicate that the host processor 110 has the ownership to use the shared memory 130.

Figure 4:
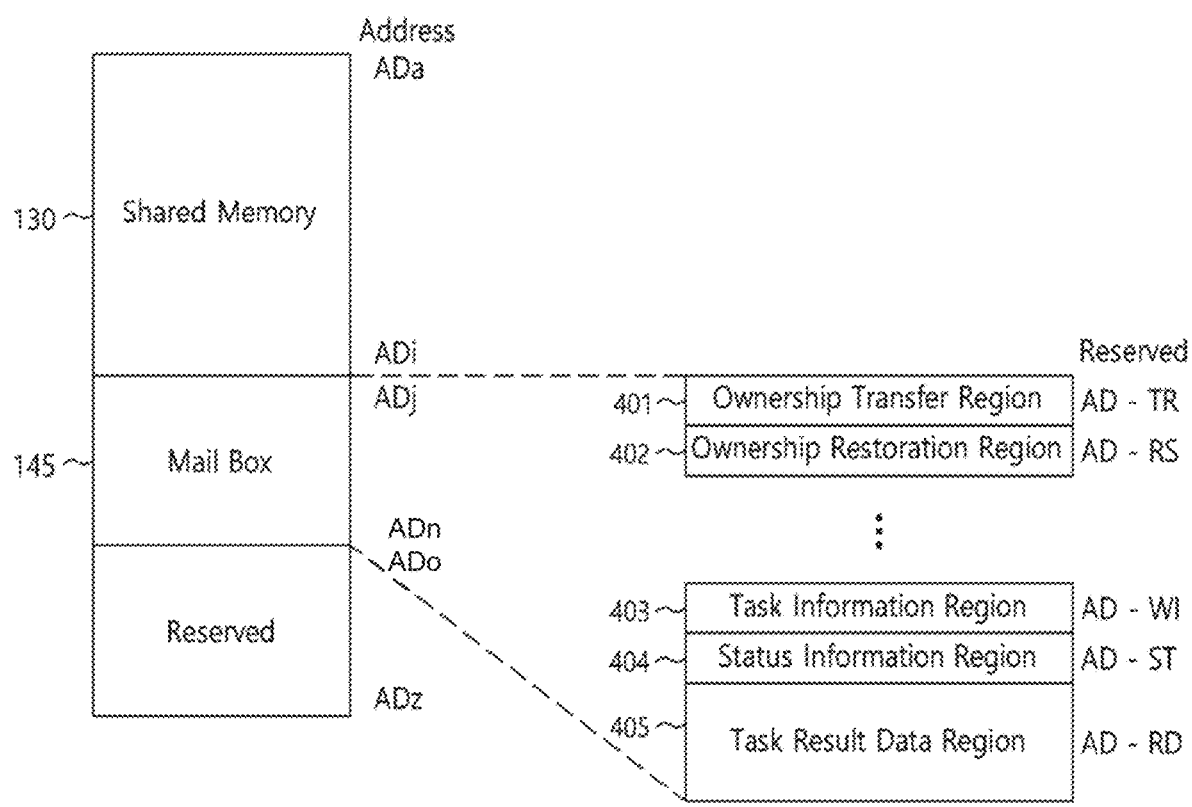
FIG. 4 illustrates the configuration of a mail box in accordance with the present embodiments.

FIG. 4 illustrates the configuration of the mail box 145 in accordance with a present embodiment. Addresses illustrated in FIG. 4 will be just used in an operating method described below. With reference to FIG. 4, the method for transferring and restoring the ownership using the mail box 145 will also be described.

FIG. 4 illustrates an address range ADa to ADz used by the host processor 110. The host processor 110 may assign a part ADa to ADi of the address range ADa to ADz to the shared memory 130. The host processor 110 may assign another part ADj to ADn of the address range ADa to ADz to the mail box 145. Another part ADo to ADz of the address range ADa to ADz might not be used but reserved.

Therefore, the memory controller 140 may determine where the address of an access command transmitted from the host processor 110 is included, between the address range ADa to ADi of the shared memory 130 and the address range ADj to ADn of the mail box 145, and process the access command according to the determination result.

The mail box 145 may include an ownership transfer region 401, an ownership restoration region 402, a task information region 403, a status information region 404 and a task result data region 405. The ownership transfer region 401, the ownership restoration region 402, the task information region 403, the status information region 404 and the task result data region 405 may correspond to addresses included in the address range ADj to ADn.

The ownership transfer region 401 may indicate a region which the host processor 110 read-accesses to transfer the ownership to the processor 120. The host processor 110 may transmit a read command and an address AD-TR of the ownership transfer region 401 to the memory controller 140, in order to transfer the ownership to the processor 120. The memory controller 140 may check the read command and the address AD-TR of the ownership transfer region 401, transmitted from the host processor 110, and give the ownership to the processor 120. The memory controller 140 may transmit transfer check data stored in the ownership transfer region 401 to the host processor 110, in response to the read command for the ownership transfer region 401. The transfer check data may indicate that the transfer of the ownership is completed, and include data which have been previously promised with the host processor 110.

The ownership restoration region 402 may indicate a region which the host processor 110 read-accesses to restore the ownership from the processor 120. The host processor 110 may transmit a read command and an address AD-RS of the ownership restoration region 402 to the memory controller 140, in order to restore the ownership from the processor 120. The memory controller 140 may check the read command and the address AD-RS of the ownership restoration region 402, transmitted from the host processor 110, and give the ownership to the host processor 110. The memory controller 140 may transmit restoration check data stored in the ownership restoration region 402 to the host processor 110, in response to the read command for the ownership restoration region 402. The restoration check data may indicate that the restoration of the ownership will be performed, and include data which have been previously promised with the host processor 110.

The task information region 403 may indicate a region for storing task information to be checked by the processor 120. The host processor 110 may store the task information in the task information region 403. The processor 120 may read the task information from the task information region 403, and check the read task information. The task information region 403 may be accessed through an address AD-WI.

The status information region 404 may indicate a region for storing the status information of the processor 120. The status information may be stored by the memory controller 140. For example, since the memory controller 140 can know where the task result data of the processor 120 are stored in the shared memory 130 as described below, the memory controller 140 can update the remaining throughput or status information of the task based on the task result data. In an embodiment, the status information may be stored in the processor 120. The host processor 110 may read the status information from the status information region 404, and check the read status information. The status information region 404 may be accessed through an address AD-ST.

The task result data region 405 may indicate a region for storing the task result data of the task processed by the processor 120. The processor 120 may store the task result data in the task result data region 405. The host processor 110 may read the task result data from the task result data region 405. That is, as described with reference to FIG. 3, the host processor 110 may read the task result data from the shared memory 130. In an embodiment, the host processor 110 may read the task result data from the task result data region 405. The task result data region 405 may be accessed through an address AD-RD.

In an embodiment, the host processor 110 might not change the ownership by accessing the mail box 145, but change the ownership through separately designated commands. The separately designated commands may be applied to store information on the current ownership in a separate register (not illustrated) included in the memory controller 140, for example, a MPR (Multi-Purpose Register). When the separately designated commands are received from the host processor 110, the memory controller 140 may store information in the separate register, the information indicating to which the ownership has been given. Thus, the memory controller 140 may form a path for the shared memory 130.

Figure 5:
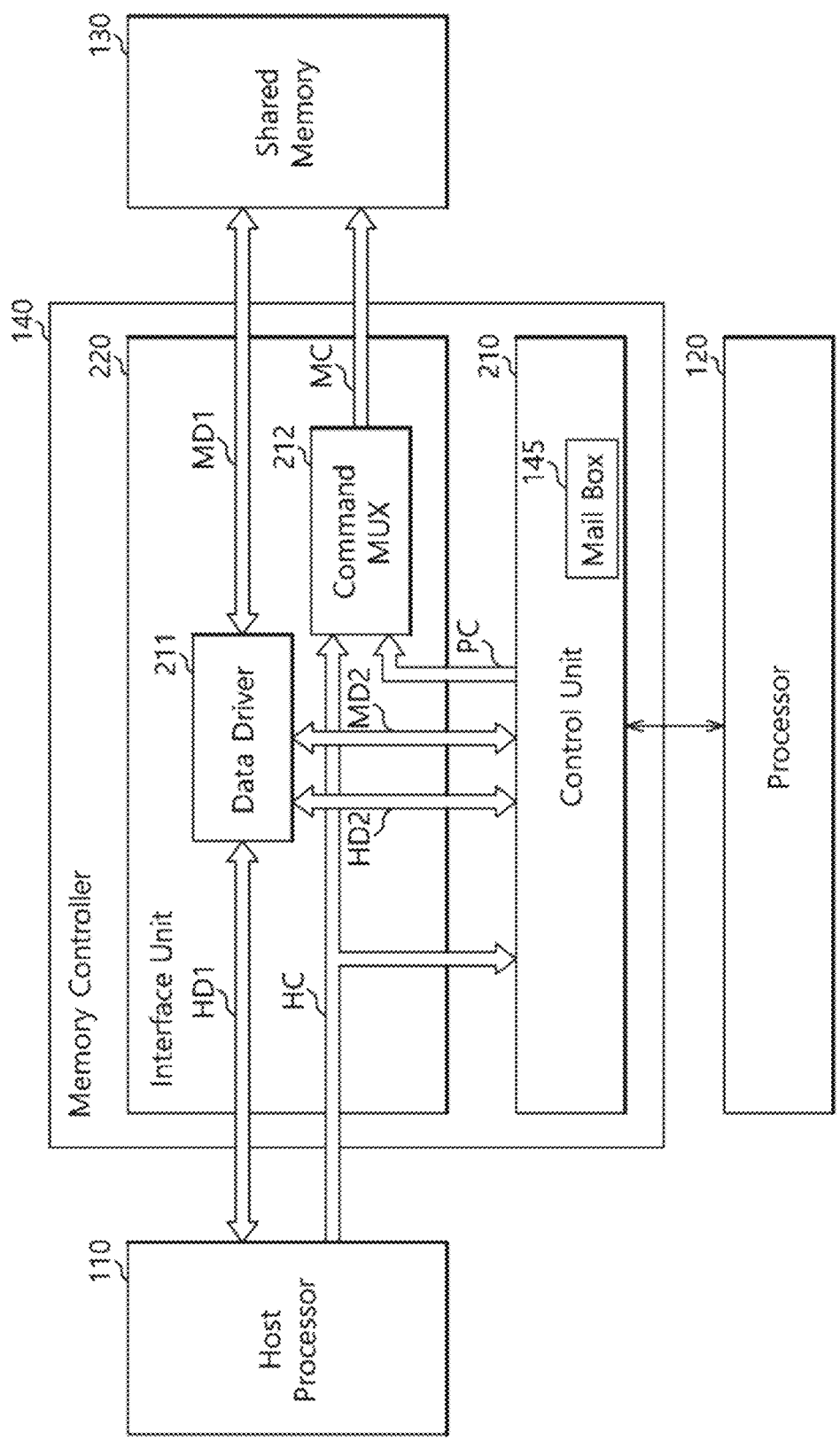
FIG. 5 is a detailed block diagram illustrating a memory controller in accordance with the present embodiments.

FIG. 5 is a block diagram illustrating the memory controller 140 in accordance with a present embodiment.

Referring to FIG. 5, the memory controller 140 may include a control unit 210 and an interface unit 220.

The control unit 210 may be coupled to the host processor 110 through a host command path HC. The control unit 210 may be coupled to a data driver 211 through a second host data path HD2 and a second memory data path MD2. The control unit 210 may be coupled to a command MUX 212 through a processor command path PC. The use of the respective paths will be described below. The control unit 210 may include the mail box 145. The control unit 210 may control the mail box 145.

The control unit 210 may give the ownership to the processor 120 according to control of the host processor 110. For example, the host processor 110 may transmit the read command and the address AD-TR of the ownership transfer region 401 of the mail box 145 through the host command path HC. Since the control unit 210 is coupled to the host processor 110 through the host command path HC at all times, the control unit 210 may receive the read command of the host processor 110 regardless of which ownership is given at the time. The control unit 210 may receive the read command and the address AD-TR of the ownership transfer region 401 through the host command path HC, and give the ownership to the processor 120. As described below, the control unit 210 may change the data path and the command path of the interface unit 220, in order to give the ownership to the processor 120.

After giving the ownership to the processor 120, the control unit 210 may transmit the transfer check data stored in the ownership transfer region 401 to the host processor 110, as a response to the read command. When the ownership is given to the processor 120, the second host data path HD2 may be coupled to a first host data path HD1 as described below. Therefore, the control unit 210 may transfer the transfer check data to the host processor 110 through the second host data path HD2 and the first host data path HD1.

The control unit 210 may give the ownership to the host processor 110 according to control of the host processor 110. For example, the host processor 110 may transmit the read command and the address AD-RS of the ownership restoration region 402 of the mail box 145 through the host command path HC. Since the control unit 210 is coupled to the host processor 110 through the host command path HC at all times, the control unit 210 may receive the read command of the host processor 110, with the ownership given to the processor 120. The control unit 210 may receive the read command and the address AD-RS of the ownership restoration region 402, and give the ownership to the host processor 110. As described below, the control unit 210 may change the data path and the command path of the interface unit 220, in order to give the ownership to the host processor 110.

Before giving the ownership to the host processor 110 or changing the data path and command path of the interface unit 220, the control unit 210 may transmit the restoration check data stored in the ownership restoration region 402 to the host processor 110, as a response to the read command. Before the ownership is given to the host processor 110, the control unit 210 may transmit the restoration check data to the host processor 110 through the second host data path HD2 and the first host data path HD1, because the second host data path HD2 may be coupled to the first host data path HD1.

The control unit 210 may process various accesses to the mail box 145 by the host processor 110 and the processor 120.

First, the control unit 210 may store task information in the task information region 403 of the mail box 145 according to control of the host processor 110.

The control unit 210 may transmit the task information stored in the task information region 403 of the mail box 145 to the processor 120, according to control of the processor 120.

The control unit 210 may store the status information of the processor 120 in the status information region 404 of the mail box 145 according to control of the processor 120. In an embodiment, since the control unit 210 directly accesses the shared memory 130 according to control of the processor 120, the control unit 210 can recognize the remaining throughput of the task of the processor 120. Therefore, the control unit 210 may store the status information of the processor 120 in the status information region 404, regardless of the control of the processor 120.

The control unit 210 may transmit the status information stored in the status information region 404 of the mail box 145 to the host processor 110, according to control of the host processor 110.

The control unit 210 may store the task result data processed by the processor 120 in the task result data region 405 of the mail box 145 according to control of the processor 120.

The control unit 210 may transmit the task result data stored in the task result data region 405 of the mail box 145 to the host processor 110, according to control of the host processor 110.

The control unit 210 may interface the processor 120 and the shared memory 130 when the ownership is given to the processor 120. For example, when the processor 120 is a hardware accelerator, the processor 120 might not generate a command depending on the interface protocol of the shared memory 130, but the control unit 210 may generate the command according to an instruction of the processor 120 and transmit the generated command to the shared memory 130. In an embodiment, the processor 120 may generate a command depending on the interface protocol of the shared memory 130. In this case, the control unit 210 may transfer the command generated by the processor 120 to the shared memory 130. In short, when the ownership is given to the processor 120, the processor 120 may access the shared memory 130 through the control unit 210. Therefore, when the ownership is given to the processor 120 as described below, the control unit 210 may control the interface unit 220 to enable a path between the control unit 210 and the shared memory 130.

The control unit 210 may control the interface unit 220 to enable paths among the host processor 110, the control unit 210 and the shared memory 130, depending on to which the ownership is given between the host processor 110 and the processor 120.

For example, when the ownership is given to the host processor 110, the control unit 210 may control the interface unit 220 to enable the path between the host processor 110 and the shared memory 130.

When the ownership is given to the processor 120, the control unit 210 may control the interface unit 220 to disable the path between the host processor 110 and the shared memory 130, and to enable the path between the control unit 210 and the shared memory 130. When the processor 120 possesses the ownership, the processor 120 may access the shared memory 130 through the control unit 210.

When the ownership is given to the processor 120, the control unit 210 may control the interface unit 220 to enable the path between the host processor 110 and the control unit 210. Therefore, while the ownership is given to the processor 120, the host processor 110 can store the task information in the mail box 145 of the control unit 210, and read the status information and the task result data from the mail box 145.

The interface unit 220 may form paths among the host processor 110, the control unit 210 and the shared memory 130 and transmit a command and data, according to control of the control unit 210. For example, when the host processor 110 possesses the ownership, the interface unit 220 may enable the path between the host processor 110 and the shared memory 130 according to control of the control unit 210. When the processor 120 possesses the ownership, the interface unit 220 may disable the path between the host processor 110 and the shared memory 130 according to control of the control unit 210, enable the path between the control unit 210 and the shared memory 130, and enable the path between the control unit 210 and the host processor 110.

The interface unit 220 may include a data driver 211 and a command MUX 212.

The data driver 211 may be coupled to the host processor 110 through the first host data path HD1. The data driver 211 may be coupled to the shared memory 130 through the first memory data path MD1. The data driver 211 may be coupled to the control unit 210 through the second host data path HD2 and the second memory data path MD2.

When the ownership is given to the host processor 110, the data driver 211 may enable the data path between the host processor 110 and the shared memory 130 according to control of the control unit 210. For example, the data driver 211 may enable the data path between the host processor 110 and the shared memory 130 by coupling the first host data path HD1 and the first memory data path MD1.

When the ownership is given to the processor 120, the data driver 211 may disable the data path between the host processor 110 and the shared memory 130, enable the data path between the host processor 110 and the control unit 210, and enable the data path between the shared memory 130 and the control unit 210, according to control of the control unit 210. For example, the data driver 211 may enable the data path between the host processor 110 and the control unit 210 by coupling the first host data path HD1 and the second host data path HD2. Furthermore, the data driver 211 may enable the data path between the shared memory 130 and the control unit 210 by coupling the first memory data path MD1 and the second memory data path MD2.

The command MUX 212 may be coupled to the host processor 110 through the host command path HC. The command MUX 212 may be coupled to the control unit 210 through the processor command path PC. The command MUX 212 may be coupled to the shared memory 130 through the memory command path MC.

When the ownership is given to the host processor 110, the command MUX 212 may enable the command path between the host processor 110 and the shared memory 130 according to control of the control unit 210. For example, the command MUX 212 may enable the command path between the host processor 110 and the shared memory 130 by coupling the host command path HC and the memory command path MC.

When the ownership is given to the processor 120, the command MUX 212 may disable the command path between the host processor 110 and the shared memory 130, and enable the command path between the control unit 210 and the shared memory 130, according to control of the control unit 210. For example, the command MUX 212 may enable the command path between the control unit 210 and the shared memory 130 by coupling the processor command path PC and the memory command path MC.

As a result, whenever the ownership is transferred or restored between the host processor 110 and the processor 120, the data path and the command path may be changed among the host processor 110, the control unit 210 and the shared memory 130.

FIGS. 6 to 13 illustrate a method in which the memory controller 140 interfaces the host processor 110, the processor 120 and the shared memory 130.

Figure 6:
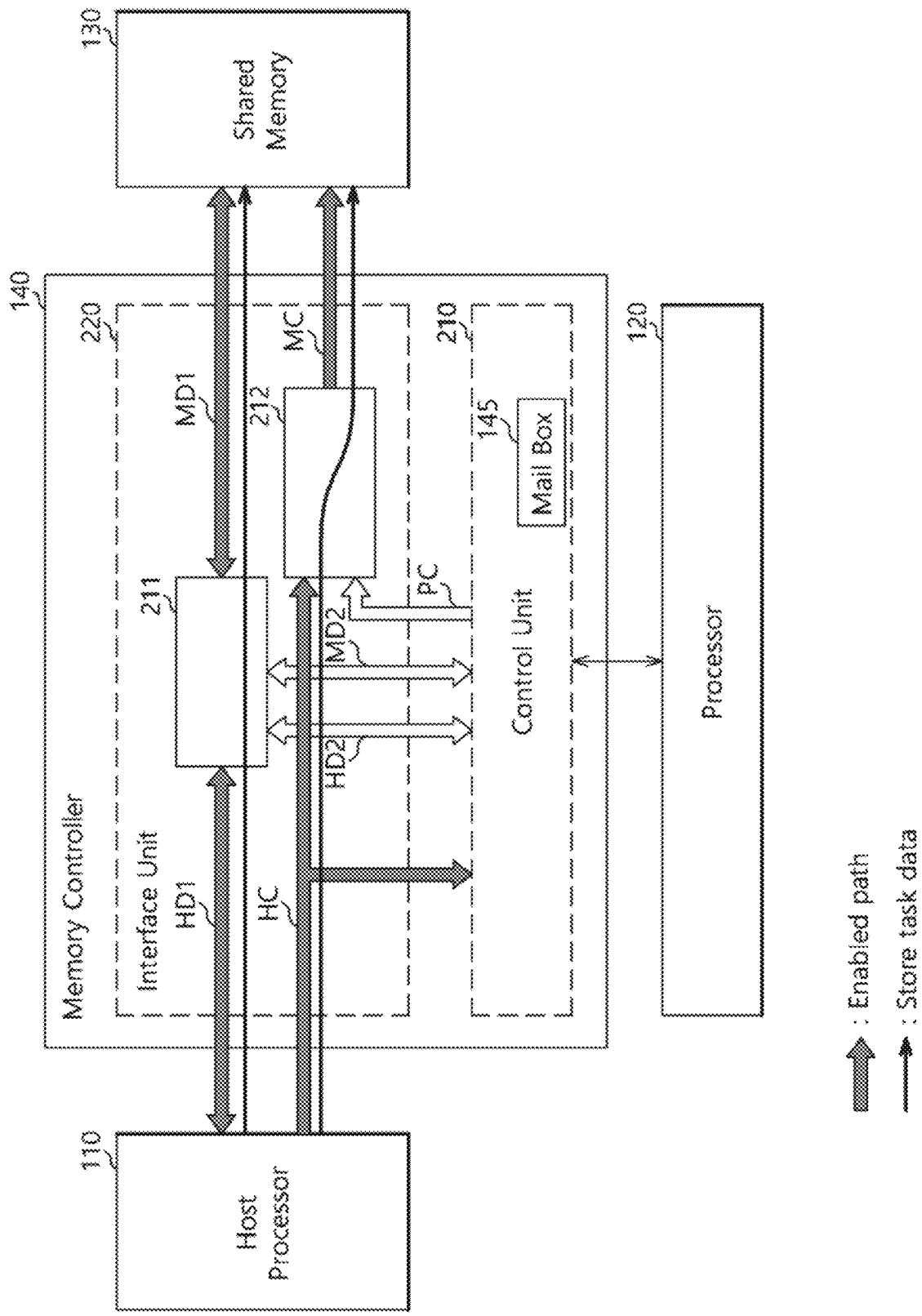
FIG. 6 illustrates a method in which the host processor stores task data in the shared memory in accordance with the present embodiments.

FIG. 6 illustrates the method in which the host processor 110 stores task data in the shared memory 130 in accordance with a present embodiment.

Referring to FIG. 6, the host processor 110 may possess the ownership.

When the host processor 110 possesses the ownership, the data driver 211 may enable the data path between the host processor 110 and the shared memory 130 by coupling the first host data path HD1 and the first memory data path MD1 according to control of the control unit 210.

When the host processor 110 possesses the ownership, the command MUX 212 may enable the command path between the host processor 110 and the shared memory 130 by coupling the host command path HC and the memory command path MC according to control of the control unit 210. In FIG. 6, paths which are enabled while coupling the host processor 110 and the shared memory 130 may be colored in gray.

Therefore, since the host processor 110 is coupled to the shared memory 130 through the interface unit 220, the host processor 110 may access the shared memory 130 to process a task. For example, the host processor 110 may transmit a write command the host command path HC and transmit task data to the first host data path HD1, in order to store the task data in the shared memory 130, the task data indicating a task which the host processor 110 will instruct the processor 120 to process.

Figure 7:
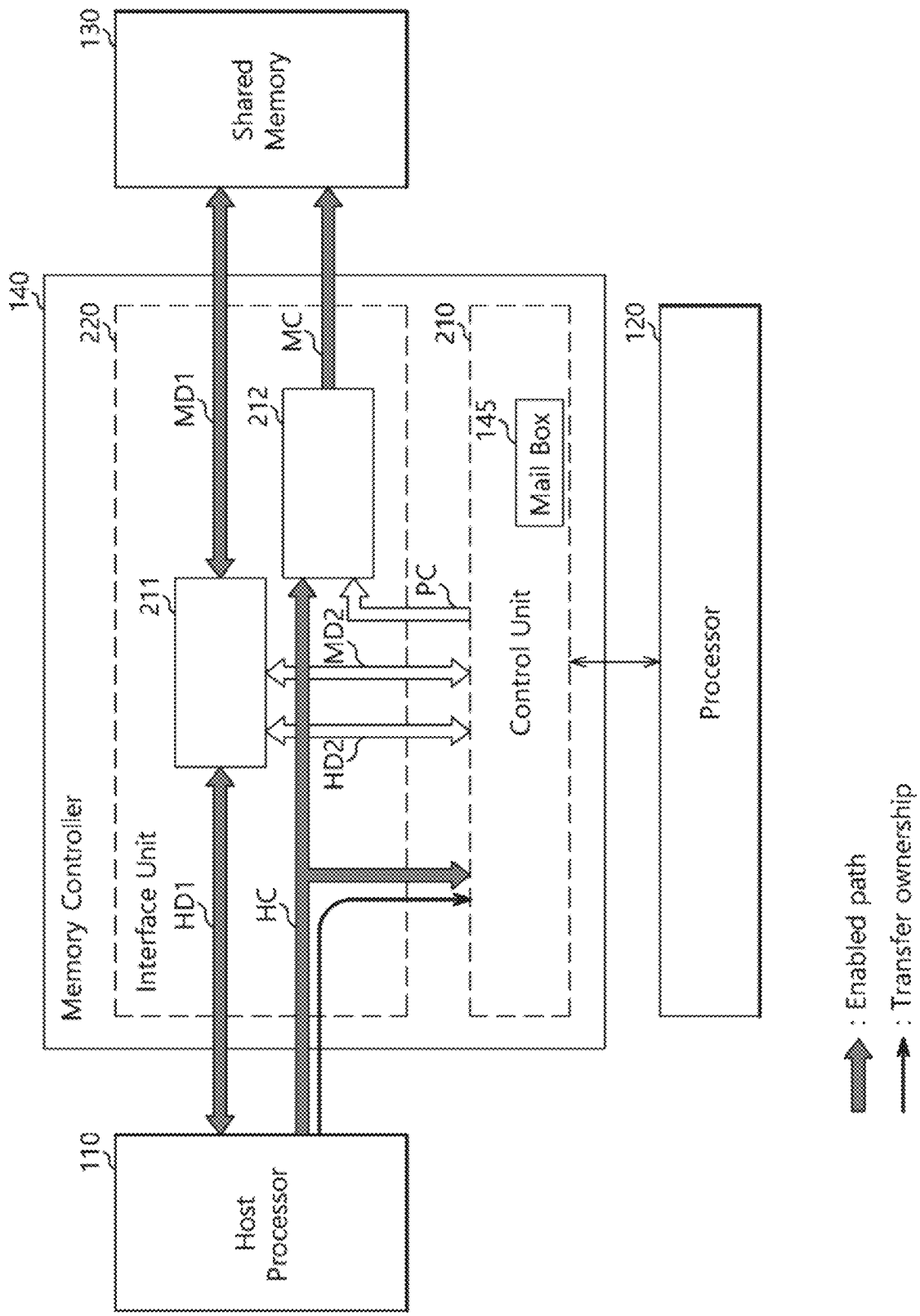
FIG. 7 illustrates a method in which the host processor transfers the ownership to the processor in accordance with the present embodiments.

FIG. 7 illustrates the method in which the host processor 110 transfers the ownership to the processor 120 in accordance with a present embodiment.

Referring to FIGS. 7 and 4, the host processor 110 may transmit the read command and the address AD-TR of the ownership transfer region 401 of the mail box 145 to the control unit 210 through the host command path HC, in order to transfer the ownership to the processor 120.

Figure 8:
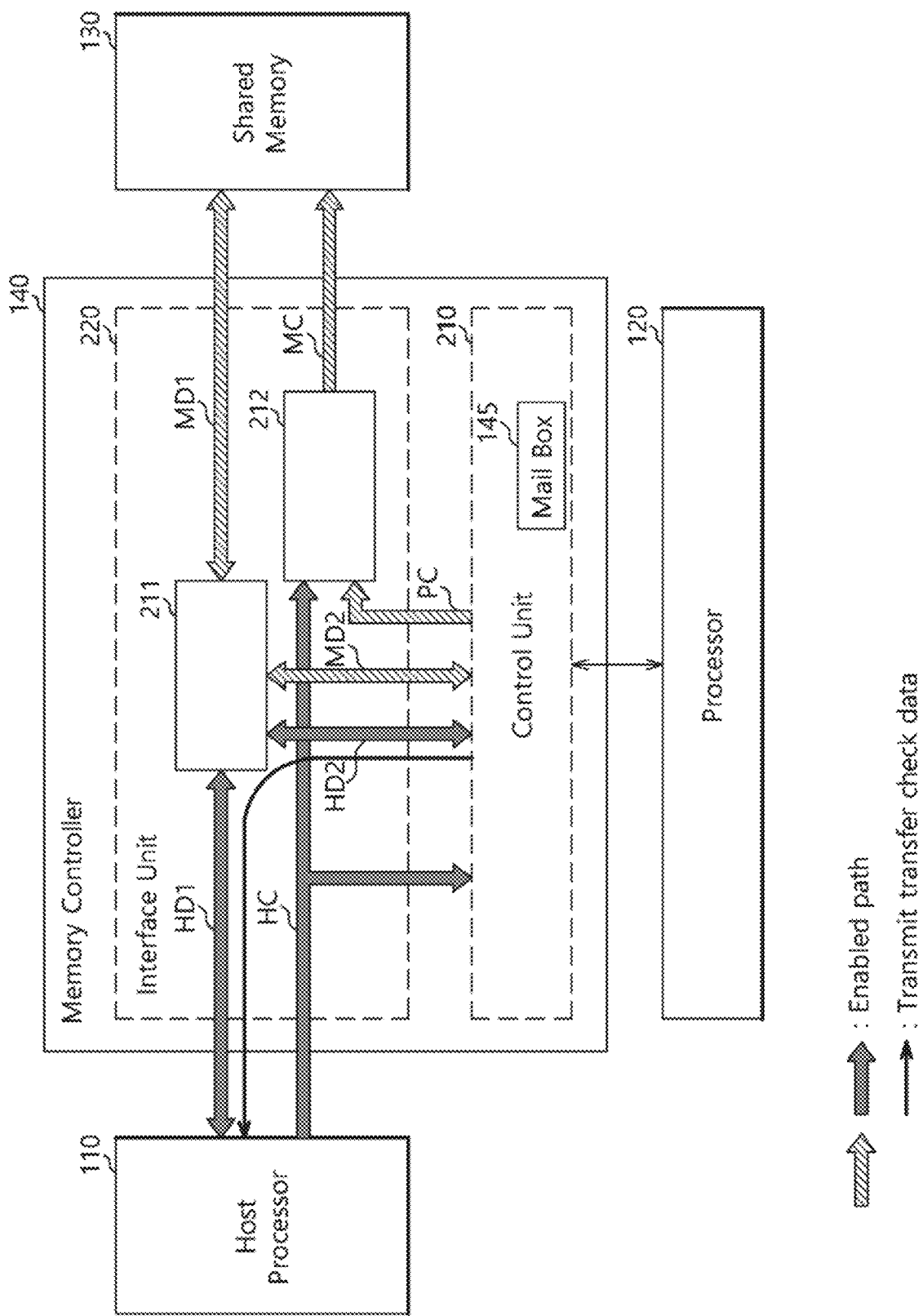
FIG. 8 illustrates a method in which the controller gives the ownership to the processor in accordance with the present embodiments.

FIG. 8 illustrates the method in which the control unit 210 gives the ownership to the processor 120 in accordance with a present embodiment.

Referring to FIGS. 8 and 4, the control unit 210 may give the ownership to the processor 120, in response to the read command and the address AD-TR of the ownership transfer region 401 of the mail box 145, transferred through the host command path HC. The control unit 210 may control the interface unit 220 to change the data path and the command path according to the change of the ownership.

For example, when the processor 120 possesses the ownership, the data driver 211 may enable the data path between the shared memory 130 and the control unit 210 by coupling the first memory data path MD1 and the second memory data path MD2 according to control of the control unit 210.

The data driver 211 may enable the data path between the host processor 110 and the control unit 210 by coupling the first host data path HD1 and the second host data path HD2 according to control of the control unit 210.

The command MUX 212 may enable the command path between the control unit 210 and the shared memory 130 by coupling the processor command path PC and the memory command path MC according to control of the control unit 210.

In FIG. 8, the paths which are enabled while coupling the host processor 110 and the control unit 210 may be colored in gray, and the paths which are enabled while coupling the shared memory 130 and the control unit 210 may be hatched.

Since the control unit 210 is coupled to the host processor 110 through the data path, the control unit 210 may transmit the transfer check data stored in the ownership transfer region 401 to the host processor 110 in response to the read command for the transfer of the ownership.

Figure 9:
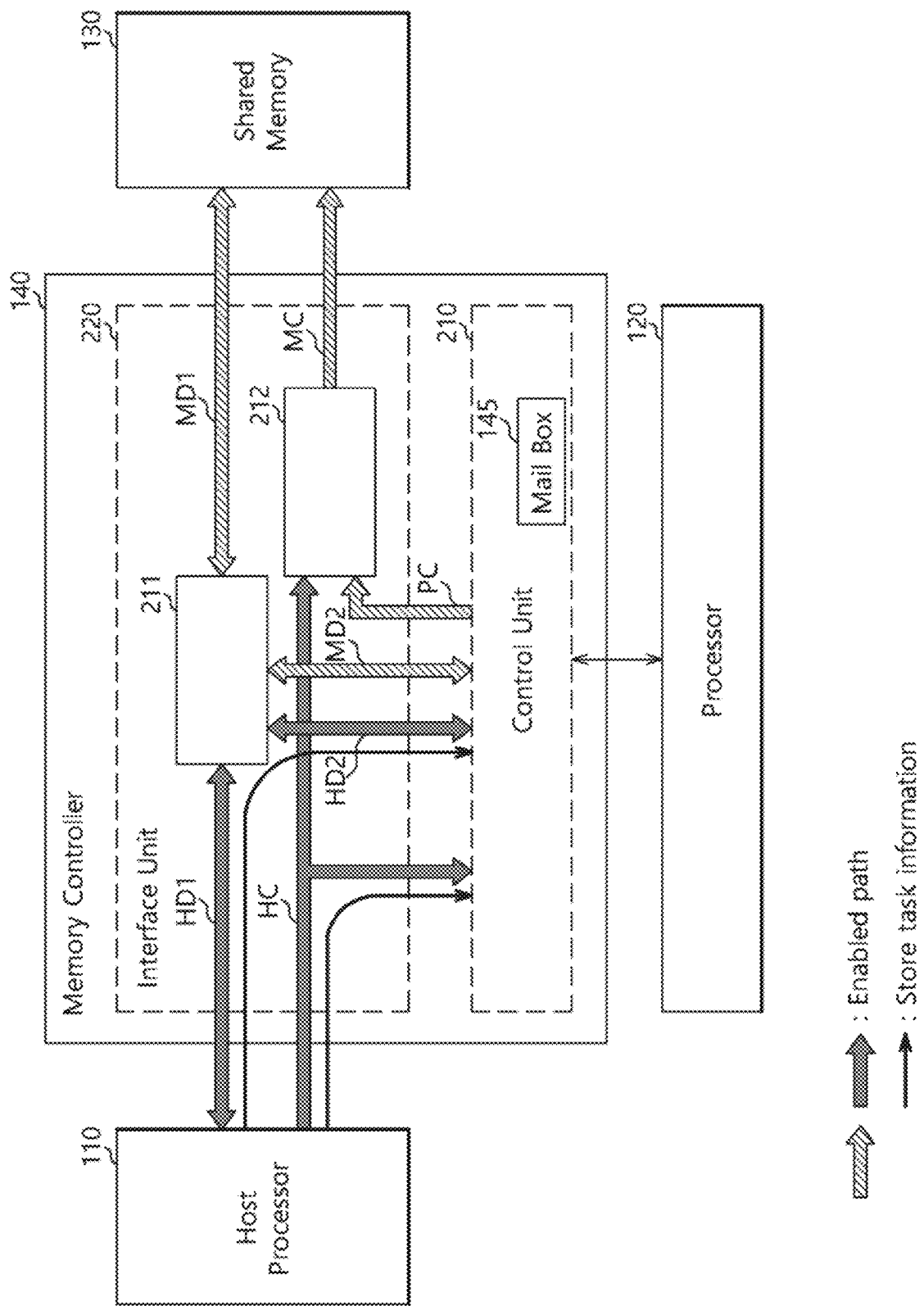
FIG. 9 illustrates a method in which the host processor stores task information in the mail box in accordance with the present embodiments.

FIG. 9 illustrates the method in which the host processor 110 stores task information in the mail box 145 in accordance with a present embodiment.

Referring to FIGS. 9 and 4, the host processor 110 may transmit the write command and the address AD-WI of the task information region 403 of the mail box 145 to the control unit 210 through the host command path HC, and transmit the task information to the control unit 210 through the first host data path HD1 and the second host data path HD2, in order to instruct the processor 120 to process the task.

The control unit 210 may store the task information in the task information region 403 of the mail box 145 in response to the write command transmitted through the host command path HC. Although not illustrated, the control unit 210 may inform the processor 120 that the task information is stored in the task information region 403.

Figure 10:
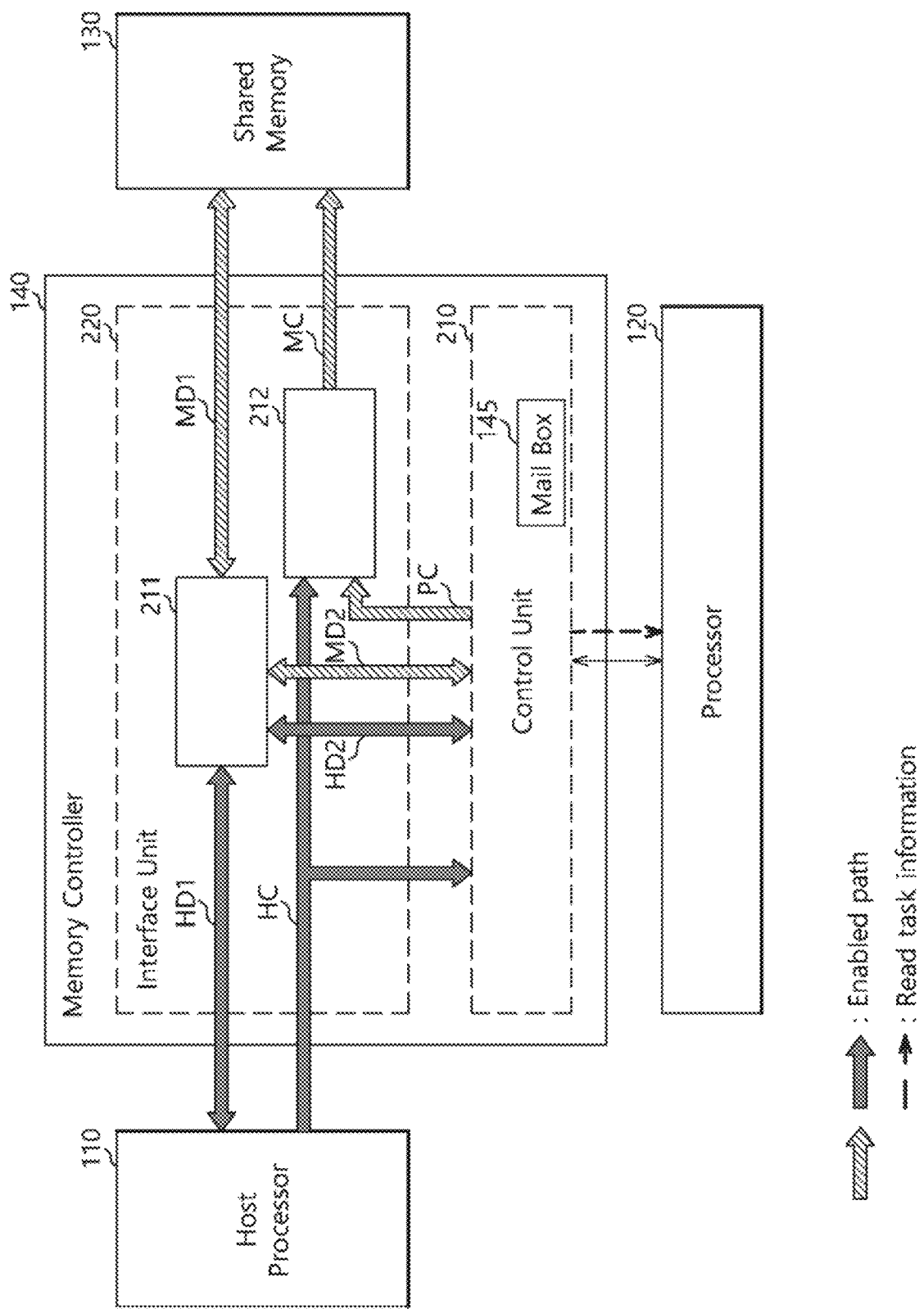
FIG. 10 illustrates a method in which the processor reads task information from the mail box in accordance with the present embodiments.

FIG. 10 illustrates the method in which the processor 120 reads the task information from the mail box 145 in accordance with a present embodiment.

Referring to FIGS. 10 and 4, the processor 120 may read the task information stored in the task information region 403 of the mail box 145. The processor 120 may check where data to be processed by the shared memory 130 are stored, through the read task information.

Figure 11:
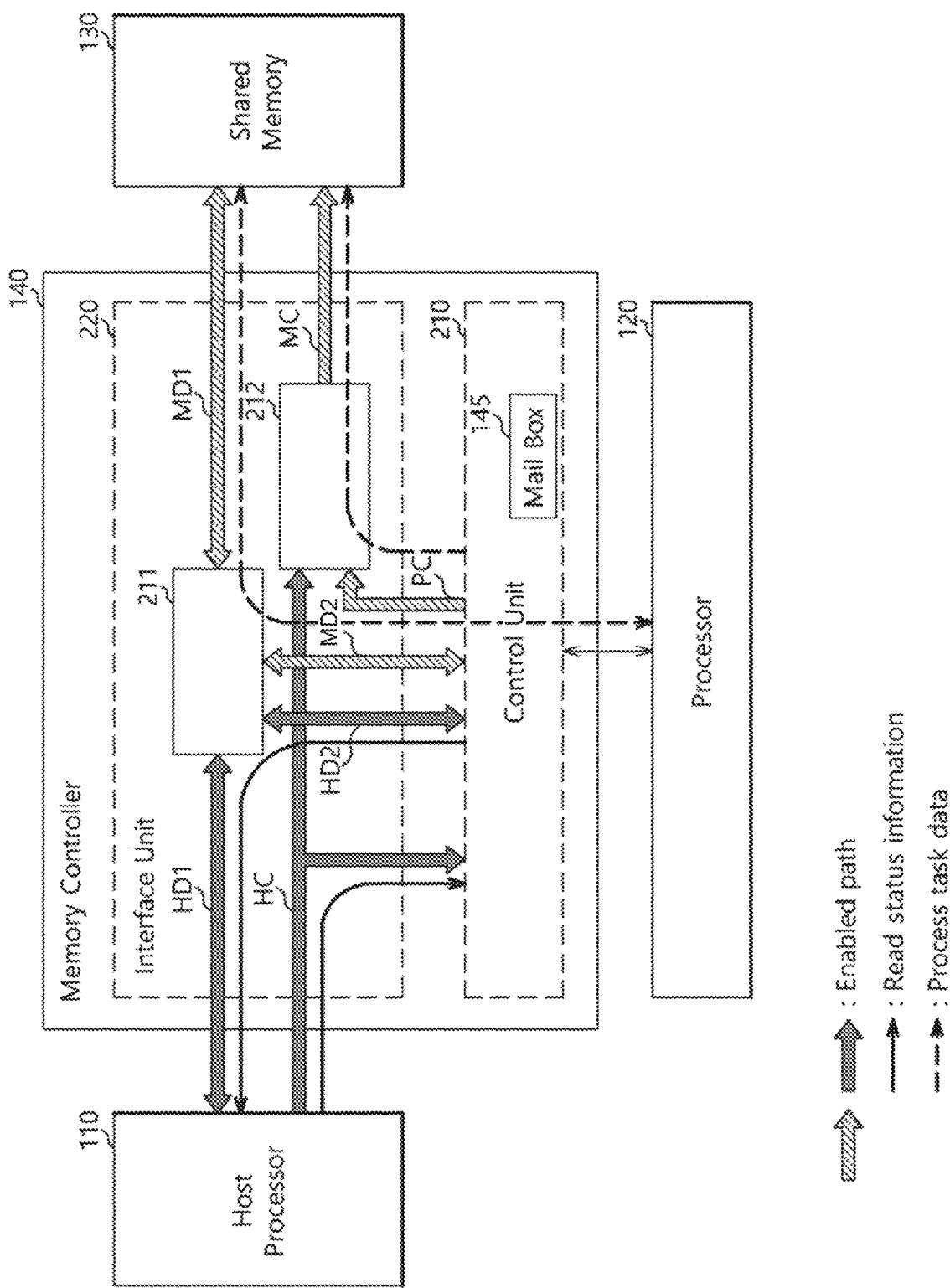
FIG. 11 illustrates a method in which the processor processes task data in accordance with the present embodiments.

FIG. 11 illustrates the method in which the processor 120 processes task data in accordance with a present embodiment.

Referring to FIGS. 11 and 4, the processor 120 may process task data by accessing the shared memory 130, because the processor 120 is coupled to the shared memory 130 through the control unit 210 and the interface unit 220. The processor 120 may read the task data from the shared memory 130, process the read data, and store the task result data in the shared memory 130. The processor 120 may exchange the task data and the task result data with the shared memory 130 through the control unit 210, the first memory data path MD1 and the second memory data path MD2. For this operation, the control unit 210 may generate a read command and write command and transmit the read command and write command to the shared memory 130 through the processor command path PC and the memory command path MC, according to control of the processor 120.

While the processor 120 processes the task, the host processor 110 may transmit the read command and the address AD-ST of the status information region 404 of the mail box 145 to the control unit 210 through the host command path HC, in order to check the status information of the processor 120.

The control unit 210 may transmit the status information to the host processor 110 in response to the read command for reading the status information. The host processor 110 may check the status information indicating that the task of the processor 120 has been completed.

Figure 12:
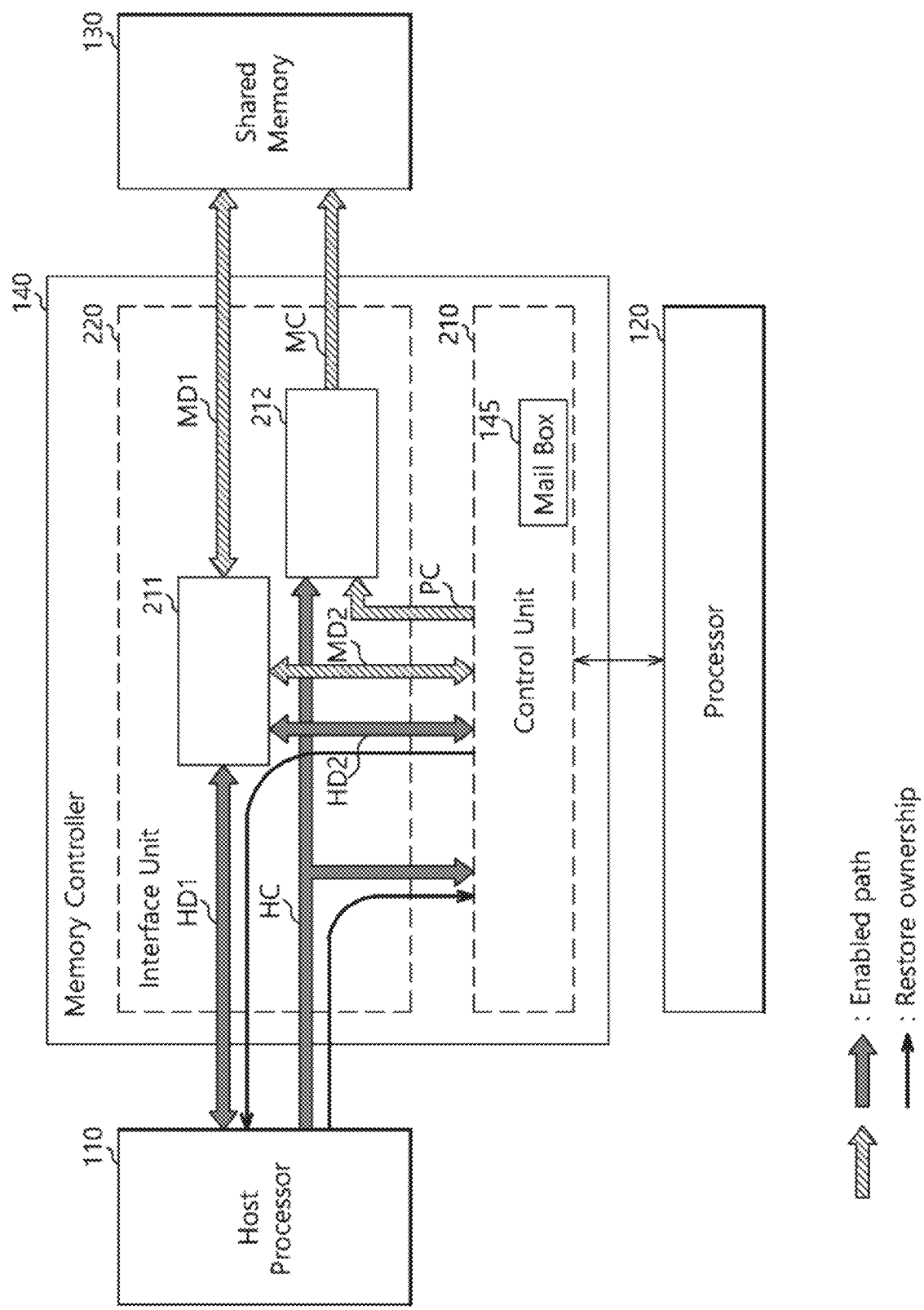
FIG. 12 illustrates a method in which the host processor restores the ownership from the processor in accordance with the present embodiments.

FIG. 12 illustrates the method in which the host processor 110 restores the ownership from the processor 120 in accordance with a present embodiment.

Referring to FIGS. 12 and 4, the host processor 110 may transmit the read command and the address AD-RS of the ownership restoration region 402 of the mail box 145 to the control unit 210 through the host command path HC, in order to restore the ownership from the processor 120 after checking the status information indicating that the task of the processor 120 has been completed.

The control unit 210 may transmit the restoration check data stored in the ownership restoration region 402 to the host processor 110 in response to the read command for checking the ownership.

Figure 13:
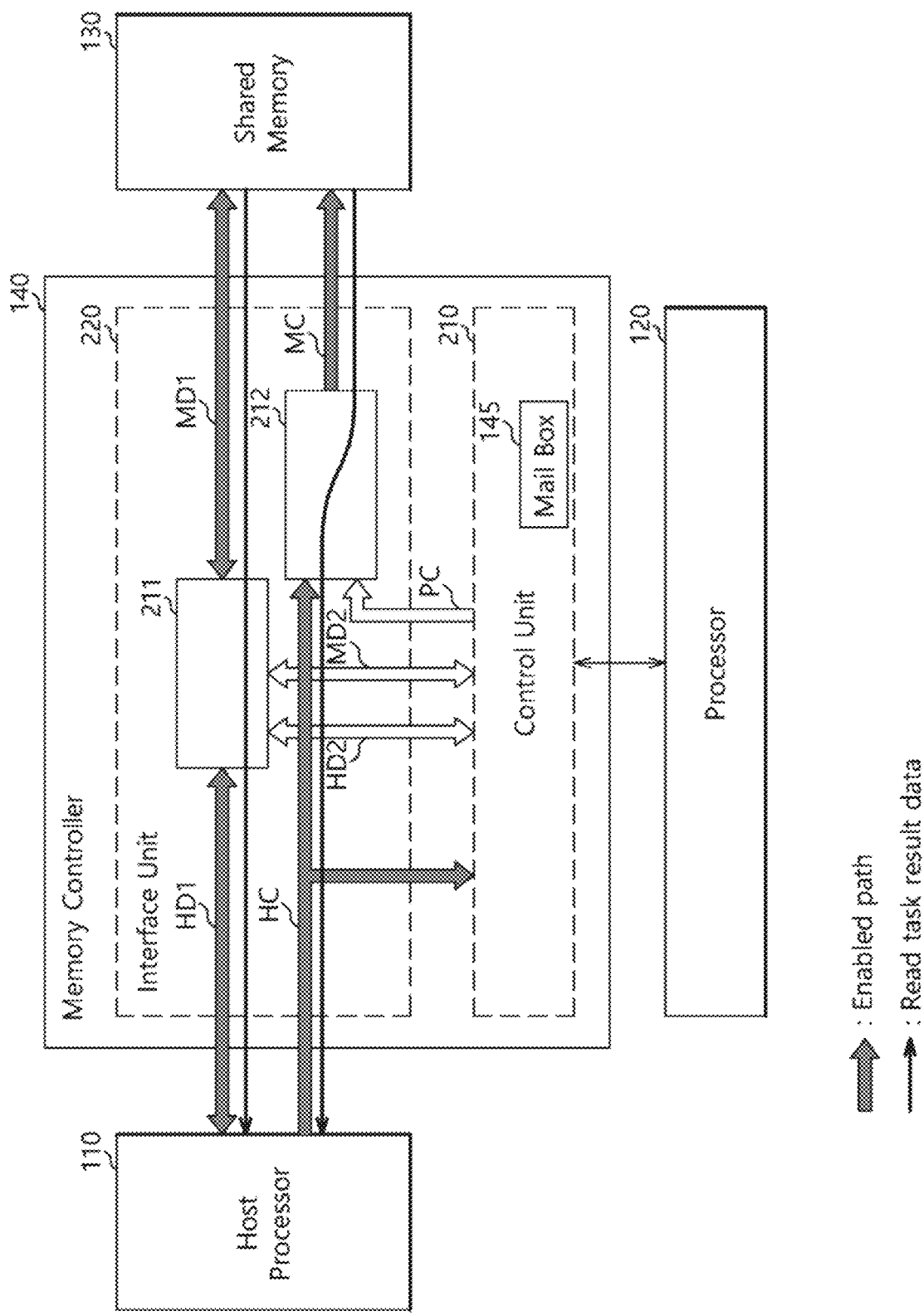
FIG. 13 illustrates a method in which the host processor reads task result data from the shared memory in accordance with the present embodiments.

FIG. 13 illustrates the method in which the host processor 110 reads the task result data from the shared memory 130 in accordance with a present embodiment.

Referring to FIGS. 13 and 4, the control unit 210 may give the ownership to the host processor 110, in response to the read command and the address AD-RS of the ownership restoration region 402 of the mail box 145, transferred through the host command path NC. The control unit 210 may control the interface unit 220 to change the data path and the command path according to the change of the ownership. As a result, the interface unit 220 may change the data path and the command path as illustrated in FIG. 6.

Therefore, since the host processor 110 is coupled to the shared memory 130 through the interface unit 220, the host processor 110 may read the task result data of the processor 120 from the shared memory 130. In order to read the task result data, the host processor 110 may transmit the read command to the host command path HC, and receive the task result data from the shared memory 130 through the first memory data path MD1 and the first host data path HD1.

Figure 14:
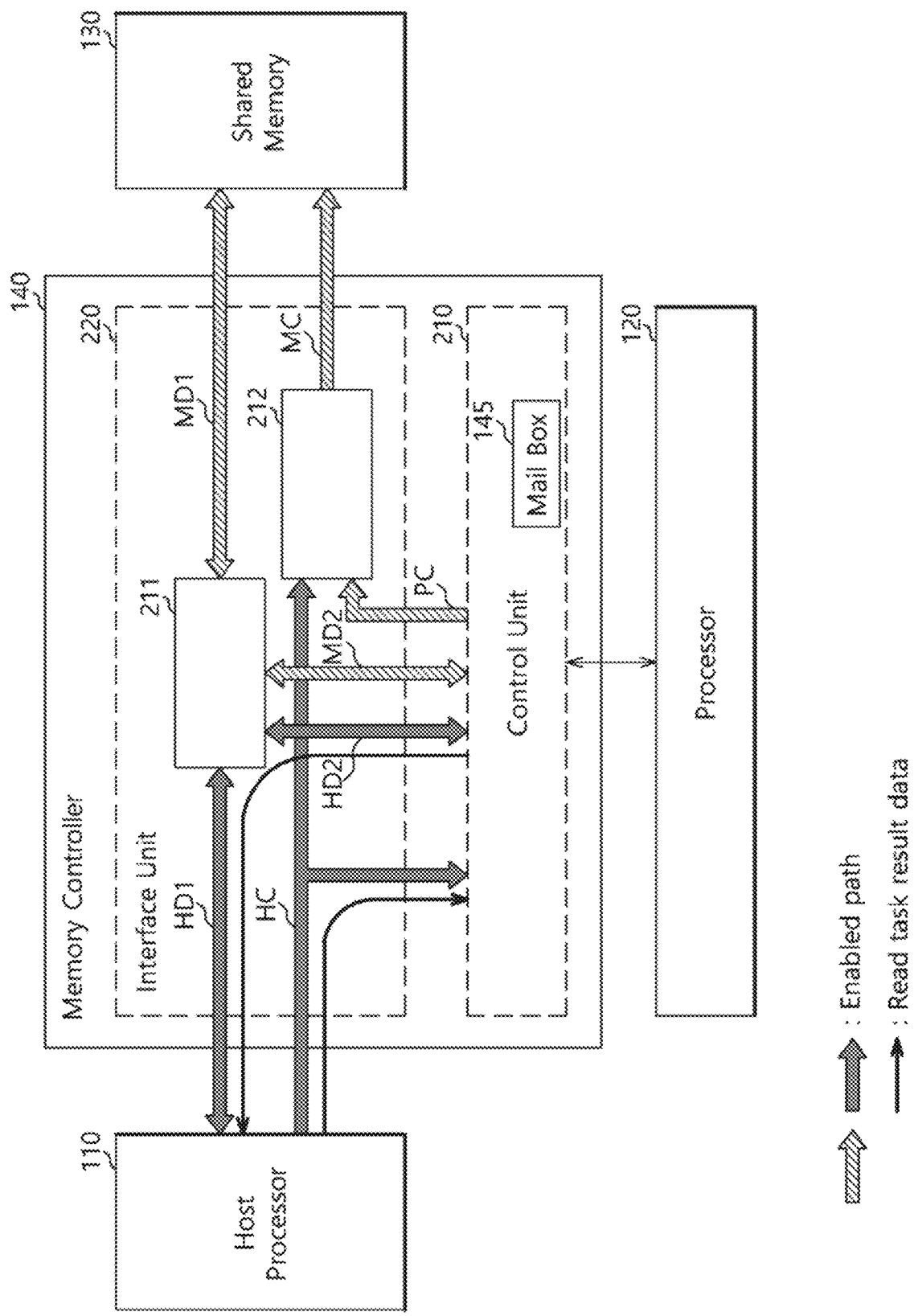
FIG. 14 illustrates a method in which the host processor reads task result data from the mail box in accordance with the present embodiments.

FIG. 14 illustrates the method in which the host processor 110 reads the task result data from the mail box 145 in accordance with a present embodiment.

Referring to FIGS. 14 and 4, the host processor 110 may read the task result data from the mail box 145 when the task result data are stored in the task result data region 405 of the mail box 145, unlike the method described with reference to FIG. 13. That is, when the status information indicates that the task of the processor 120 has been completed in the situation of FIG. 11, the host processor 110 might not restore the ownership, but reads the task result data from the mail box 145. In order to read the task result data, the host processor 110 may transmit the read command and the address AD-RD of the task result data region 405 of the mail box 145 to the control unit 210 through the host command path NC.

Figure 15:
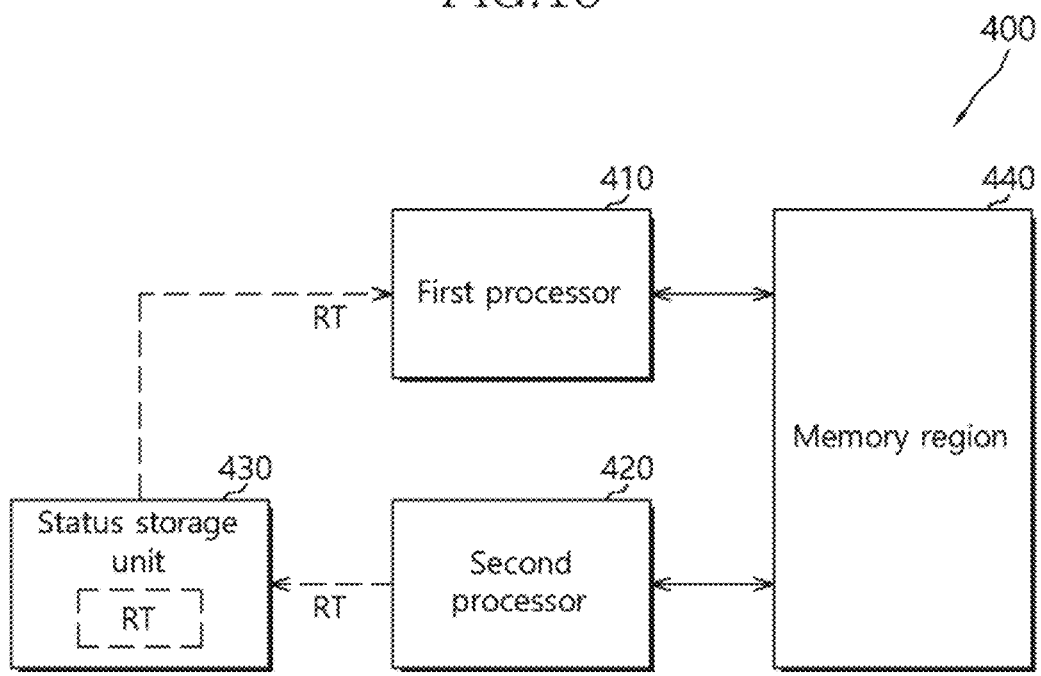
FIG. 15 is a block diagram illustrating a data processing system in accordance with an embodiment.

FIG. 15 is a block diagram illustrating a data processing system 400 in accordance with an embodiment.

Referring to FIG. 15, the data processing system 400 may include a first processor 410, a second processor 420, a status storage unit 430 and a memory region 440.

The first processor 410 may instruct the second processor 420 to process a task using the memory region 440. The first processor 410 may repeatedly read the remaining throughput RT of the task processed by the second processor 420 from the status storage unit 430 at each check timing based on a check period. As described later, the remaining throughput RT may be updated in the status storage unit 430 while the second processor 420 processes the task. The first processor 410 may perform the subsequent task when determining that the second processor 420 ended the task, based on the remaining throughput RT.

At this time, when the check period of the remaining throughput RT is too fast, power may be unnecessarily consumed. On the other hand, when the check period is too slow, the progress of the subsequent task may be delayed because the operation of checking that the second processor 420 ended the task is delayed. Therefore, the first processor 410 needs to check the remaining throughput RT through a small number of times, without missing the time when the second processor 420 ends the task. For this operation, the first processor 410 needs to properly adjust the check period according to the remaining throughput RT.

For example, the first processor 410 may calculate check period throughput based on the current remaining throughput RT of the current check timing and the previous remaining throughput RT of the previous check timing, and adjust the check period based on the current remaining throughput RT and the check period throughput.

The first processor 410 may set a difference between the previous remaining throughput RT and the current remaining throughput RT to the check period throughput.

When the current remaining throughput RT exceeds a value obtained by applying a predetermined increasing rate to the check period throughput, the first processor 410 may increase the check period by the corresponding increasing rate. When the current remaining throughput RT is equal to or less than the value obtained by applying the predetermined increasing rate to the check period throughput and exceeds the check period throughput, the first processor 410 may maintain the current check period without adjusting the current check period. When the current remaining throughput RT is equal to or less than the check period throughput, the first processor 410 may decrease the check period by a predetermined decreasing rate.

In an embodiment, the increasing rate and the decreasing rate might not be constant, but varied at each check timing.

The first processor 410 may calculate the check period throughput by reading the remaining throughput RT two or more times in the check period set to a predetermined initial value, and then adjust the check period. For example, after the operation of the second processor 420 is started, the first processor 410 may start reading the remaining throughput RT from the status storage unit 430. When the remaining throughput RT is present or has a value which is not "0", for example, the first processor 410 may set the check period to the initial value, and read the remaining throughput RT from the status storage unit 430 at check timing based on the check period.

The remaining throughput RT may be decided according to a currently accessed address in a predetermined address range of the memory region 440 in which the task result of the second processor 420 is to be stored.

Figure 16:
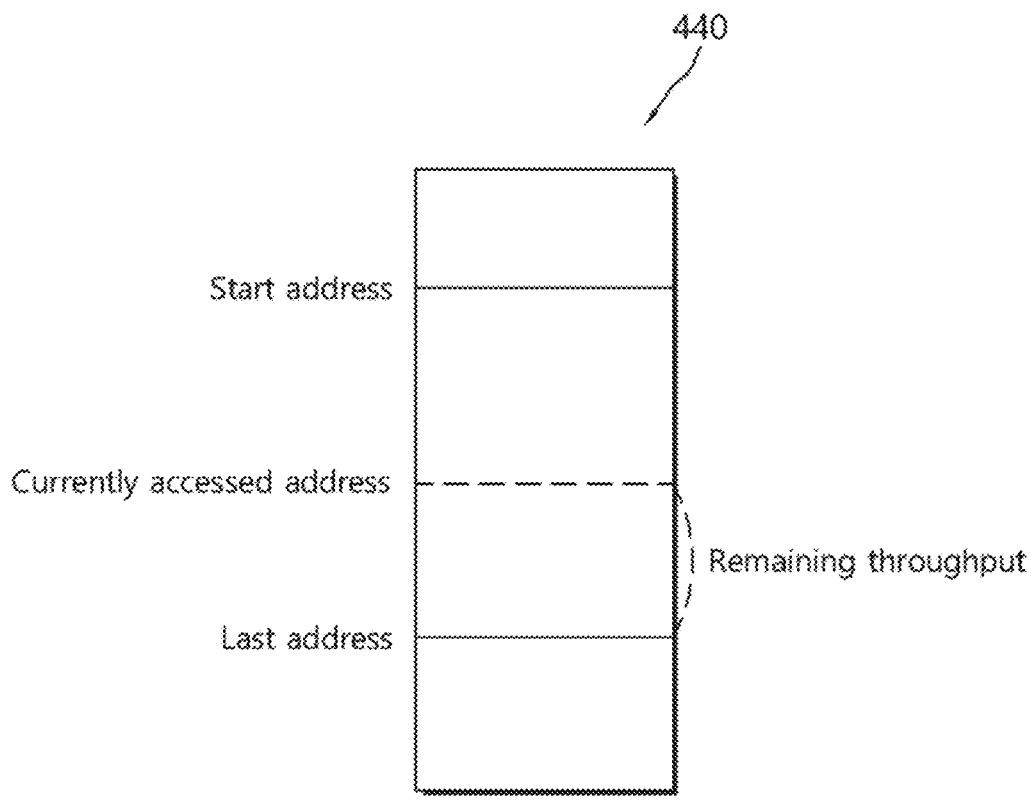
FIG. 16 illustrates the remaining throughput of a task processed by a second processor in accordance with the embodiments.

FIG. 16 illustrates the remaining throughput RT of a task processed by the second processor 420 in accordance with an embodiment.

Referring to FIG. 16, the result of the task processed by the second processor 420 may be sequentially stored in the address range from the start address to the last address of the memory region 440. The address range may be assigned when the first processor 410 instructs the second processor 420 to perform a task.

Therefore, the remaining throughput RT of the second processor 420 may be decided on the basis of the last address and the currently accessed address. For example, the remaining throughput RT may indicate a difference between the last address and the currently accessed address. For another example, the remaining throughput RT may indicate a data size corresponding to an address range from the currently accessed address to the last address.

Referring back to FIG. 15, the status storage unit 430 may store the remaining throughput RT of the task which is being processed by the second processor 420. The remaining throughput RT may be directly updated by the second processor 420. In an embodiment, when a memory controller (not illustrated) for controlling an access to the memory region 440 is separately present, the remaining throughput RT may be stored by the memory controller. The status storage unit 430 may output the remaining throughput RT to the first processor 410 according to control of the first processor 410.

The status storage unit 430 may include various elements capable of storing data, such as a register, latch and flip-flop. FIG. 15 illustrates the status storage unit 430 as a block distinguished from the second processor 420. In an embodiment, however, the status storage unit 430 may be included in the second processor 420.

The memory region 440 may store the result of the task processed by the second processor 420. When the task of the second processor 420 is completed, the first processor 410 may read the task result from the memory region 440.

In an embodiment, the first processor 410 may correspond to the host processor 110 of FIG. 1. The status storage unit 430 may correspond to the mail box 145 of FIG. 1. That is, the host processor 110 of FIG. 1 may adjust the check period of the status information stored in the mail box 145 of FIG. 1, according to the method in which the first processor 410 adjusts the check period of the remaining throughput RT.

Figure 17:
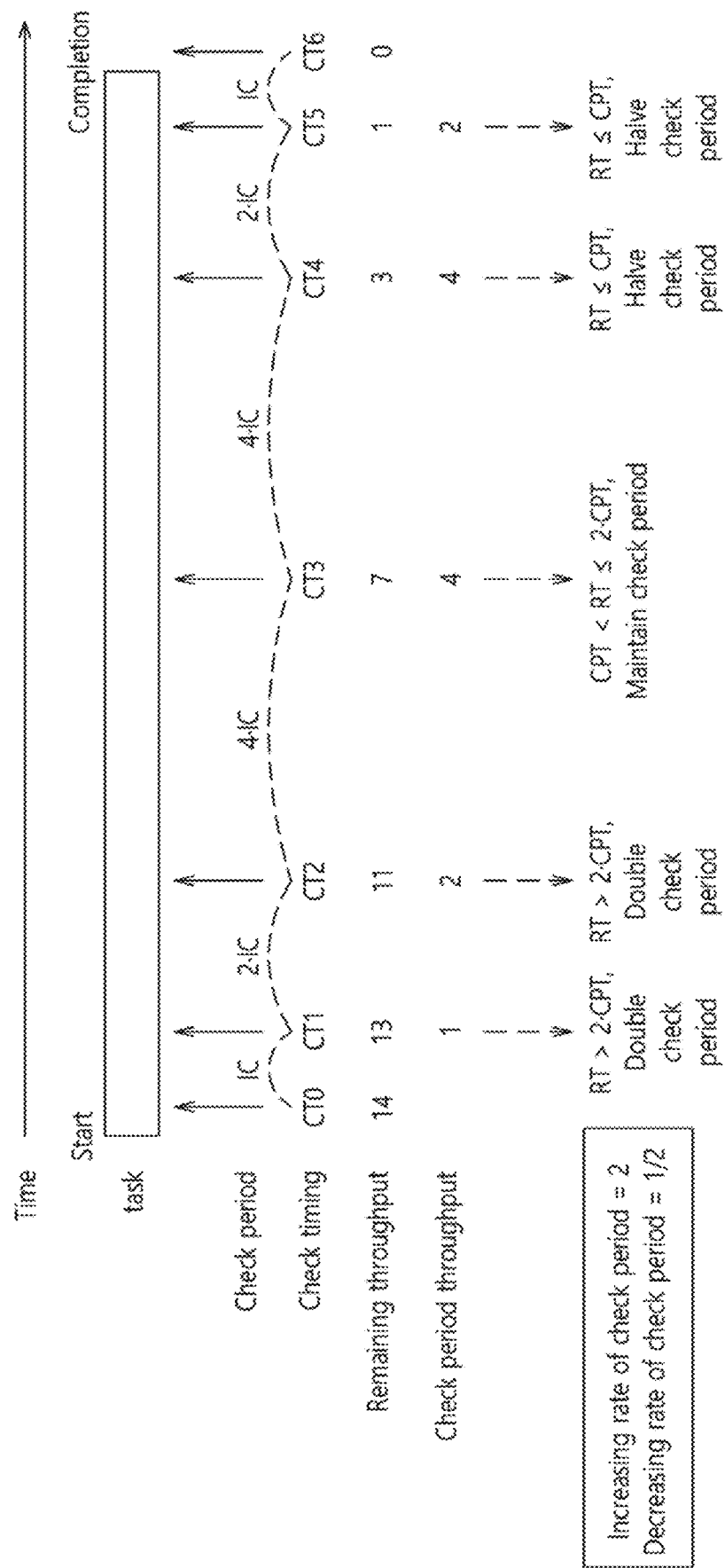
FIG. 17 illustrates a method in which a first processor of FIG. 8 adjusts a check period of the remaining throughput in accordance with the present embodiments.

FIG. 17 illustrates the method in which the first processor 410 of FIG. 15 adjusts the check period of the remaining throughput RT in accordance with a present embodiment. FIG. 17 is based on the supposition that the increasing rate of the check period is 2 and the decreasing rate is ½.

Referring to FIG. 17, the remaining throughput RT may be updated in the status storage unit 430 while the second processor 420 processes a task, and the first processor 410 may read the remaining throughput RT from the status storage unit 430 at check timing while adjusting the check period, and checks whether the task of the second processor 420 was ended.

For example, the first processor 410 may read the remaining throughput RT of "14" at check timing CT0. Since the remaining throughput RT is not "0", the first processor 410 may set the check period to the initial value IC.

Then, at check timing CT1 after the check period IC has passed, the first processor 410 may read the remaining throughput RT of "13", and calculate a difference of "1" between the previous remaining throughput RT of "14" and the current remaining throughput RT of "13" as the check period throughput CPT. The first processor 410 may decide that the current remaining throughput RT of "13" is more than double of the check period throughput CPT of "1". At this time, the reason for comparing the double of the check period throughput CPT to the current remaining throughput RT is because the increasing rate of the check period will be 2. As a result, the first processor 410 may double the check period IC to a check period 2·IC.

Then, at check timing CT2 after the check period 2·IC has passed, the first processor 410 may read the remaining throughput RT of "11", and calculate a difference of "2" between the previous remaining throughput RT of "13" and the current remaining to throughput RT of "11" as the check period throughput CPT. The first processor 410 may decide that the current remaining throughput RT of "11" is more than double of the check period throughput CPT of "2", and as such double the check period 2·IC to a check period 4·IC.

Then, at check timing CT3 after the check period 4·IC has passed, the first processor 410 may read the remaining throughput RT of "7", and calculate a difference of "4" between the previous remaining throughput RT of "11" and the current remaining throughput RT of "7" as the check period throughput CPT. The first processor 410 may decide that the current remaining throughput RT of "7" is equal to or less than double the check period throughput CPT of "4"

and the check period throughput CPT exceeds "4", and maintain the check period 4·IC.

Then, at check timing CT4 after the maintained check period 4·IC has passed, the first processor 410 may read the remaining throughput RT of "3", and calculate a difference of "4" between the previous remaining throughput RT of "7" and the current remaining throughput RT of "3" as the check period throughput CPT. The first processor 410 may decide that the current remaining throughput RT of "3" is equal to or less than the check period throughput CPT of "4", and halve the check period 4·IC to the check period 2·IC.

Then, at check timing CT5 after the decreased check period 2·IC has passed, the first processor 410 may read the remaining throughput RT of "1", and calculate a difference of "2" between the previous remaining throughput RT of "3" and the current remaining to throughput RT of "1" as the check period throughput CPT. The first processor 410 may decide that the current remaining throughput RT of "1" is equal to or less than the check period throughput CPT of "2", and halve the check period 2·IC to the check period IC.

Then, at check timing CT6 after the decreased check period IC has passed, the first processor 410 may read the remaining throughput RT of "0", and decide that the task of the second processor 420 was ended.

Therefore, the data processing system in accordance with a present embodiment can reduce power consumption by delaying the check period at the early stage of the task, and capture the end timing of the task by advancing the check period at the late stage of the task. Thus, the next task can be performed without delay.

Figure 18:
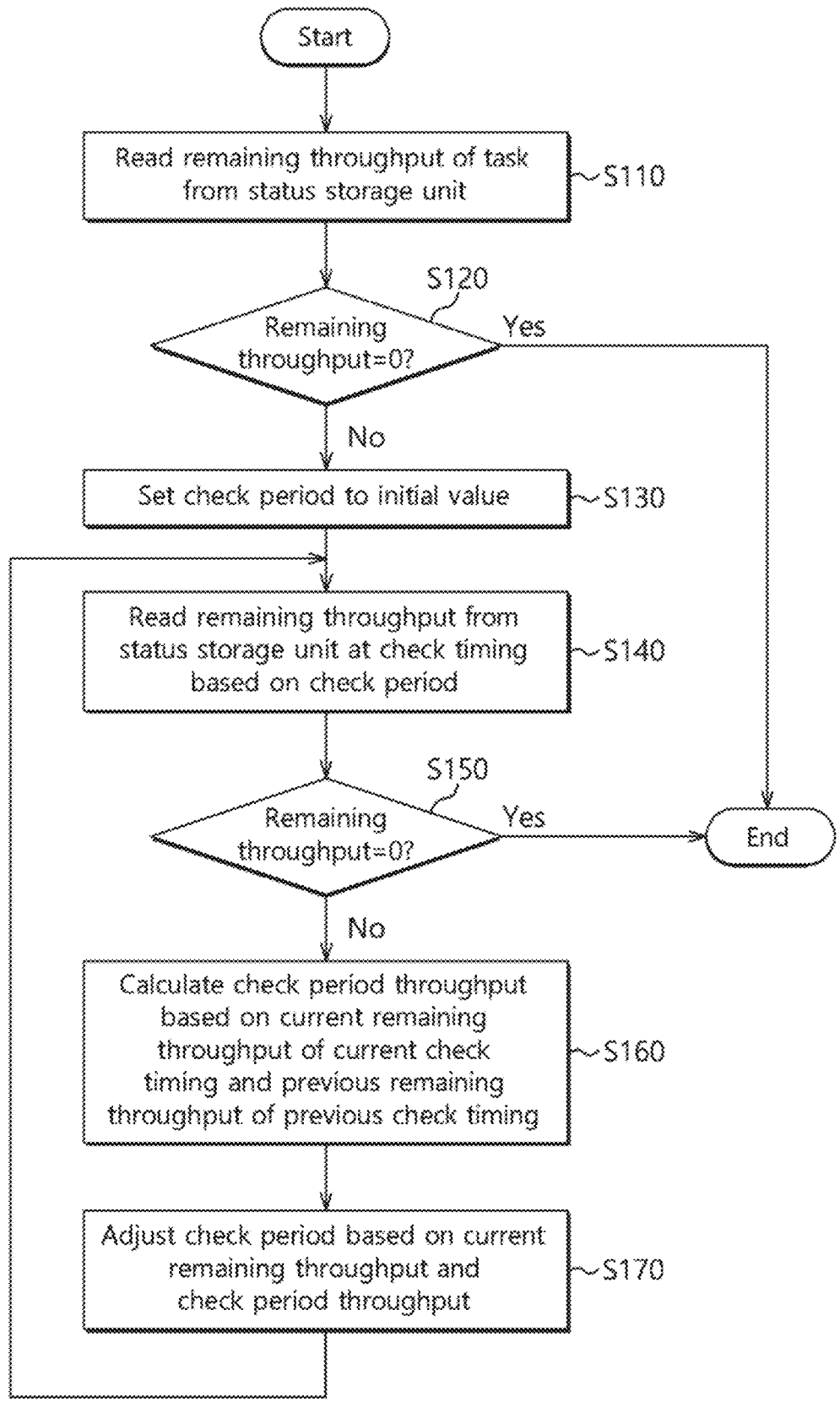
FIG. 18 is a flowchart illustrating an operating method of the data processing system in accordance with the present embodiments.

FIG. 18 is a flowchart illustrating an operating method of the data processing system 400 in accordance with an embodiment. FIG. 18 illustrates the method in which the first processor 410 checks the end of a task of the second processor 420 by reading the remaining throughput RT of the second processor 420, which is updated in the status storage unit 430, after the second processor 420 starts the task.

Referring to FIG. 18, the first processor 410 may read the remaining throughput RT from the status storage unit 430, after the task of the second processor 420 is started, at step S110.

At step S120, the first processor 410 may determine whether the remaining throughput RT is "0". When the remaining to throughput RT is "0", the procedure may be ended. However, when the remaining throughput RT is not "0", the procedure may proceed to step S130.

At step 130, the first processor 410 may set the check period to the initial value.

At step S140, the first processor 410 may read the remaining throughput from the status storage unit 430 at check timing based on the check period.

At step S150, the first processor 410 may determine whether the remaining throughput RT is "0". When the remaining throughput RT is "0", the procedure may be ended. However, when the remaining throughput RT is not "0", the procedure may proceed to step S160.

At step S160, the first processor 410 may calculate the check period throughput based on the current remaining throughput of the current check timing and the previous remaining throughput of the previous check timing. For example, the first processor 410 may set a difference between the previous remaining throughput RT and the current remaining throughput RT to the check period throughput.

At step S170, the first processor 410 may adjust the check period based on the current remaining throughput and the check period throughput. Then, the procedure may proceed to step S140. That is, the first processor 410 may repeatedly read the remaining throughput according to the adjusted check period.

Figure 19:
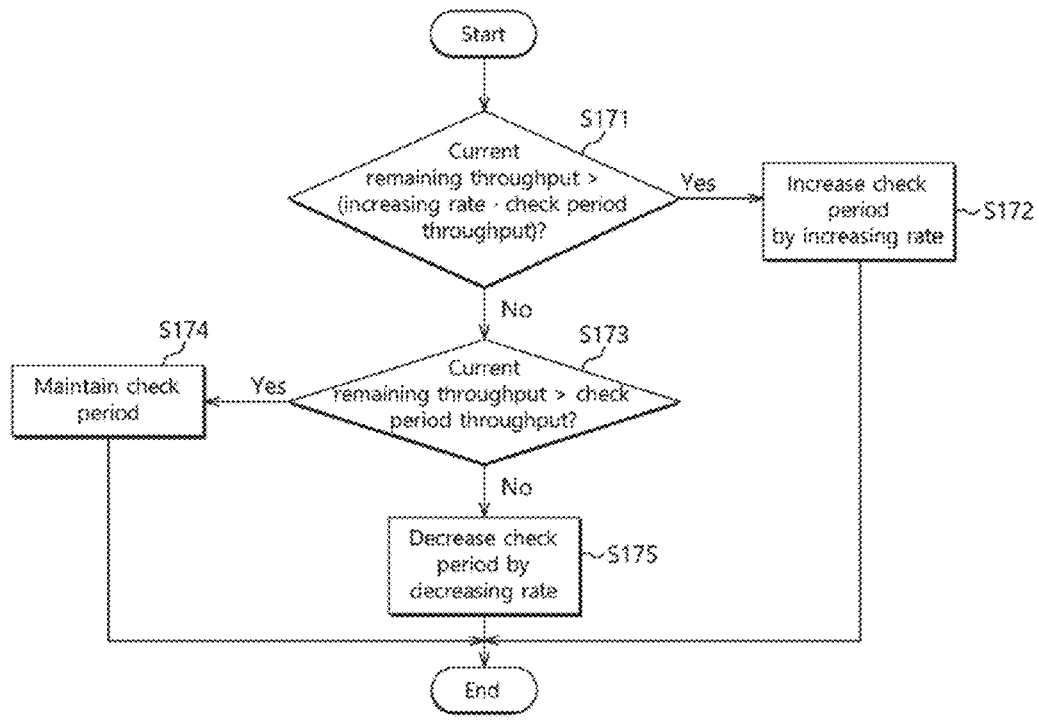
FIG. 19 is a flowchart illustrating the method in which the first processor adjusts the check period in accordance with the present embodiments.

FIG. 19 is a flowchart illustrating the method in which the first processor 410 adjusts the check period in accordance with a present embodiment. FIG. 19 illustrates a specific embodiment of step S170 in FIG. 18.

At step S171, the first processor 410 may determine whether the current remaining throughput RT exceeds a value obtained by applying the predetermined increasing rate to the check period throughput. When it is determined that the current remaining throughput RT exceeds the value obtained by applying the predetermined increasing rate to the check period throughput, the procedure may proceed to step S172. However, when it is determined that the current remaining throughput RT is equal to or less than the value obtained by applying the predetermined increasing rate to the check period throughput, the procedure may proceed to step S173.

At step S172, the first processor 410 may increase the check period by the corresponding increasing rate.

At step S173, the first processor 410 may determine whether the current remaining throughput RT exceeds the check period throughput. When it is determined that the current remaining throughput RT exceeds the check period throughput, the procedure may proceed to step S174. However, when it is determined that the current remaining throughput RT is equal to or less than the check period throughput, the procedure may proceed to step S175.

At step S174, the first processor 410 may maintain the check period without adjusting the check period.

At step S175, the first processor 410 may decrease the check period by the predetermined decreasing rate.

Figure 20:
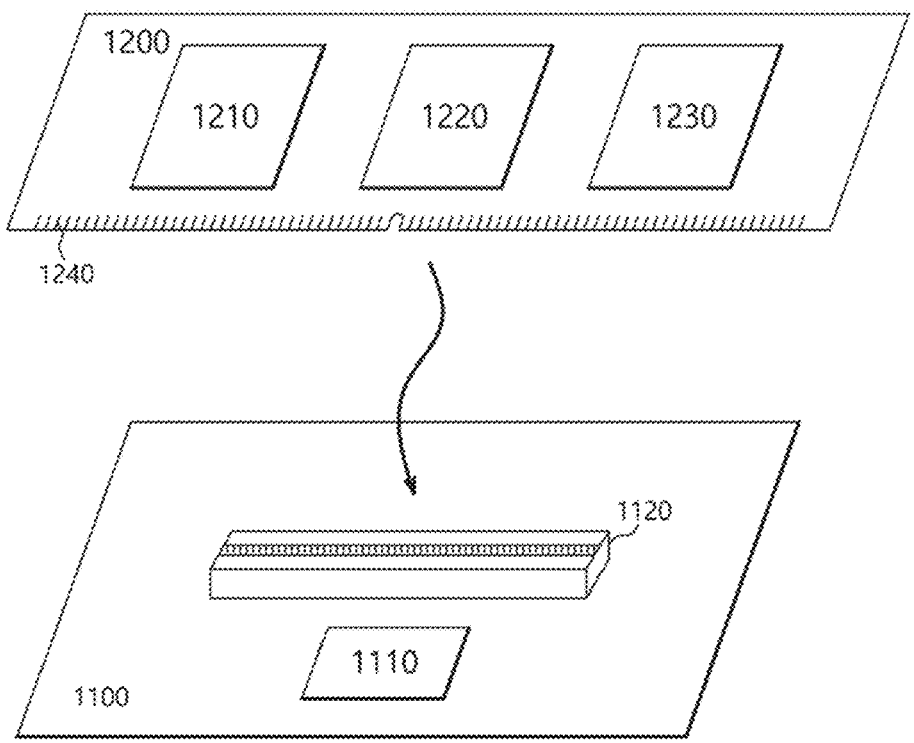
FIG. 20 illustrates a data processing system in accordance with an embodiment.

FIG. 20 illustrates a data processing system 1000 in accordance with an embodiment. Referring to FIG. 20, the data processing system 1000 may include a host device 1100 and a memory system 1200.

The host device 1100 may be configured as a board such as a printed circuit board. The host device 1100 may include a host processor 1110 and a connection terminal 1120.

The host processor 1110 may correspond to the host processor 1110 of FIG. 1.

The connection terminal 1120 may include a socket, slot or connector, and the memory system 1200 may be mounted on the connection terminal 1120.

The memory system 1200 may be configured as a board such as a printed circuit board. The memory system 1200 may be referred to as a memory module or memory card. The memory system 2200 may include a processor 1210, a memory device 1220, a memory controller 1230 and a connection terminal 1240.

The processor 1210 may correspond to the processor 120 of FIG. 1. The memory device 1220 may correspond to the shared memory 130 of FIG. 1. The memory controller 1230 may correspond to the memory controller 140 of FIG. 1.

The connection terminal 1240 may be connected to the connection terminal 1120 of the host device 1100. Through the connection terminal 1240, power and signals such as a command, address and data may be transferred between the host device 1100 and the memory system 1200. The connection terminal 1240 may be configured in various manners depending on an interface method between the host device 1100 and the memory system 1200. The connection terminal 1240 may be arranged at one side of the memory system 1200.

Figure 21:
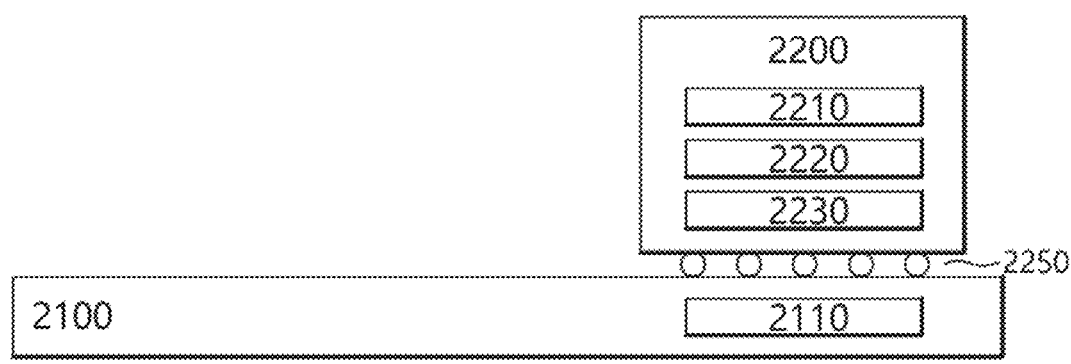
FIG. 21 illustrates a data processing system in accordance with an embodiment.

FIG. 21 illustrates a data processing system 2000 in accordance with an embodiment. Referring to FIG. 21, the data processing system 2000 may include a host device 2100 and a memory system 2200.

The host device 2100 may be configured as a board such as a printed circuit board. The host device 2100 may include a host processor 2110. The host processor 2110 may correspond to the host processor 110 of FIG. 1.

The memory system 2200 may be configured as a surface-mounted package. The memory system 2200 may be mounted on the host device 2100 through solder balls 2250.

The memory system 2200 may include a processor 2210, a memory device 2220 and a memory controller 2230. The processor 2210 may correspond to the processor 120 of FIG. 1. The memory device 2220 may correspond to the shared memory 130 of FIG. 1. The memory controller 2230 may correspond to the memory controller 140 of FIG. 1.

Figure 22:
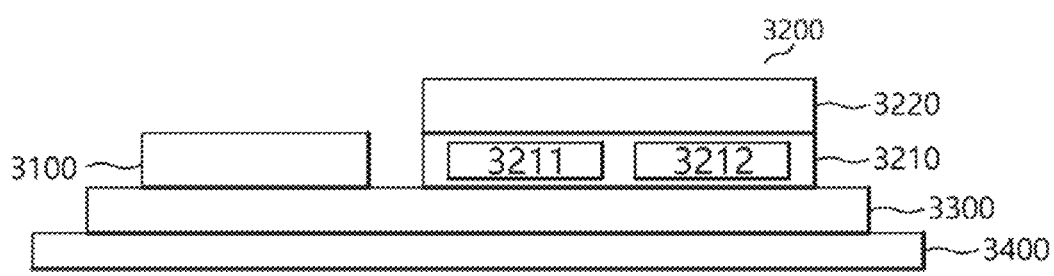
FIG. 22 illustrates a data processing system in accordance with an embodiment.

FIG. 22 illustrates a data processing system 3000 in accordance with an embodiment. Referring to FIG. 22, the data processing system 3000 may include a host processor 3100, a memory system 3200, an interposer 3300 and a semiconductor substrate 3400.

The host processor 3100 and the memory system 3200 may be arranged on one surface of the interposer 3300.

The interposer 3300 may electrically connect the host processor 3100 and the memory system 3200. Through the interposer 3300, power and signals such as a command, address and data may be transferred between the host processor 3100 and the memory system 3200. The interposer 3300 may be mounted on the semiconductor substrate 3400.

The host processor 3100 may correspond to the host processor 110 of FIG. 1.

The memory system 3200 may include a logic semiconductor device 3210 and a memory device 3220 which are stacked therein. The logic semiconductor device 3210 may control the operation of the memory system 3200. The logic semiconductor device 3210 may include a processor 3211 and a memory controller 3212. The processor 3211 may correspond to the processor 120 of FIG. 1. The memory controller 3212 may correspond to the memory controller 140 of FIG. 1.

The memory device 3220 may correspond to the shared memory 130 of FIG. 1.

The memory system 3200 may include a high bandwidth memory (HBM), for example.

Figure 23:
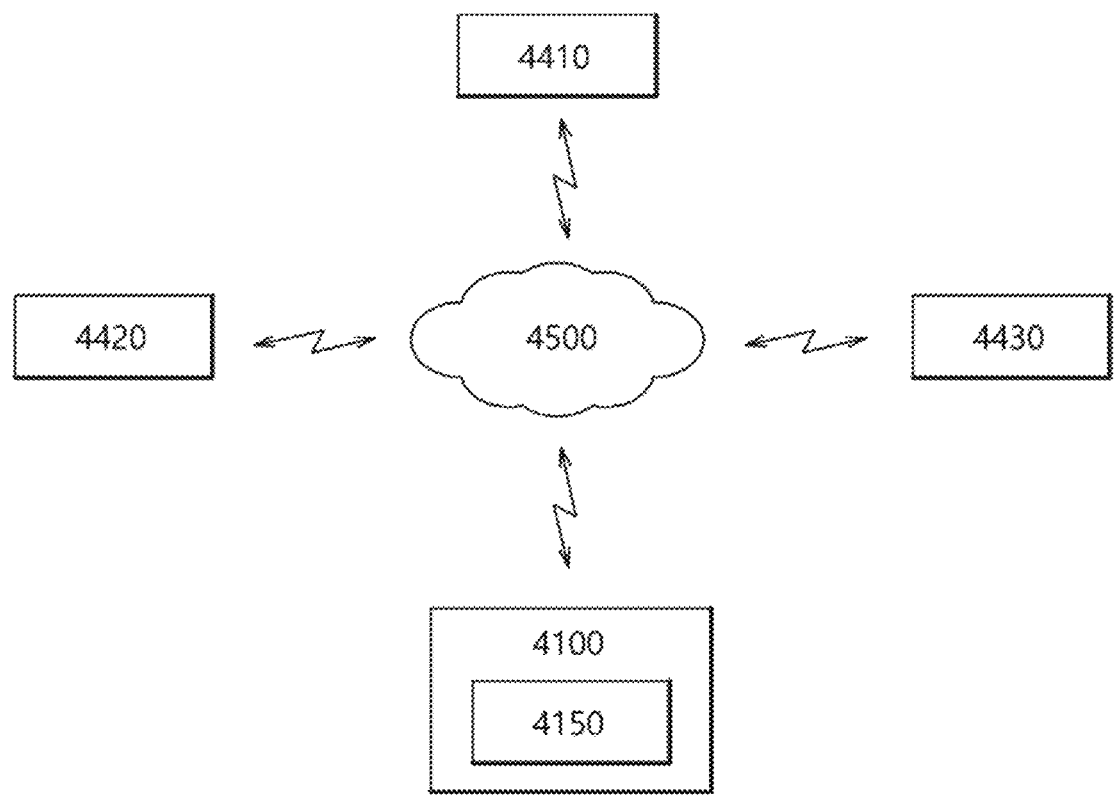
FIG. 23 illustrates a network system including a memory system in accordance with an embodiment.

FIG. 23 illustrates a network system 4000 including a data processing system 4150 in accordance with an embodiment. Referring to FIG. 23, the network system 4000 may include a server system 4100 and a plurality of client systems 4410 to 4430, which is are connected through a network 4500.

The server system 4100 may serve data in response to requests of the plurality of client systems 4410 to 4430. For example, the server system 4100 may store data provided from the plurality of client systems 4410 to 4430. For another example, the server system 4100 may provide data to the plurality of client systems 4410 to 4430.

The server system 4100 may include the data processing system 4150. The data processing system 4150 may be configured as the data processing system 100 of FIG. 1, the data processing system 1000 of FIG. 20, the data processing system 2000 of FIG. 21, or the data processing system 3000 of FIG. 22.

While various embodiments have been described above, it will be understood to those skilled in the art that the embodiments described are examples only. Accordingly, the operating method of a data storage device described herein should not be limited based on the described embodiments.

What is claimed is:

1. A data processing system comprising:
a shared memory;
a host processor configured to process a first task by accessing the shared memory when possessing an ownership of the shared memory;
a processor configured to process a second task by accessing the shared memory when possessing the ownership; and
a memory controller coupled to the host processor, the processor, and the shared memory, and the memory controller configured to allow the host processor or the processor to access the shared memory according to the ownership,
wherein the memory controller comprises a mail box,
wherein the memory controller comprises:
a control unit configured to give the ownership to the host processor or the processor in response to an access to the mail box by the host processor; and
an interface unit configured to form a path among the host processor, the shared memory, and the control unit, according to control of the control unit,
wherein the control unit controls the interface unit to change the path according to the change of the ownership,
wherein in order to give the ownership to the processor in response to a first access to the mail box by the host processor, the control unit controls the interface unit to form a first data path and first command path between the shared memory and the control unit and to form a second data path between the host processor and the control unit,
wherein the host processor transfers the ownership to the processor, and then transmits task information on the second task to the control unit through the second data path, and
wherein the control unit stores the task information in the mail box according to control of the host processor.

2. The data processing system according to claim 1, wherein the processor is coupled to the control unit, and accesses the shared memory through the control unit when possessing the ownership.

3. The data processing system according to claim 1, wherein the control unit transmits the transfer check data to the host processor through the second data path in response to the first access.

4. The data processing system according to claim 1, wherein in order to give the ownership to the host processor in response to a second access to the mail box by the host processor, the control unit controls the interface unit to form a third data path and second command path between the host processor and the shared memory.

5. The data processing system according to claim 4, wherein the control unit transmits restoration check data to the host processor through the second data path in response to the second access, and then gives the ownership to the host processor.

6. The data processing system according to claim 1, wherein the processor reads the task information from the mail box, checks the read task information, and processes the second task.

7. The data processing system according to claim claim 1, wherein the processor stores task result data of the second task in the mail box, and
the host processor reads the task result data from the mail box through the second data path.

8. The data processing system according to claim 1, wherein the host processor is coupled to the interface unit and the control unit through a host command path, and transmits an access command for the shared memory or the mail box to the host command path.

9. The data processing system according to claim 8, wherein the host processor assigns to the mail box a first address range which does not overlap a second address range assigned to the shared memory, and
the control unit processes an access command transmitted from the host processor by comparing an address of the access command to the first address range and the second address range.

10. The data processing system according to claim 1, wherein the mail box comprises an ownership transfer region, and
the host processor transmits the read command for the ownership transfer region to the memory controller in order to transfer the ownership to the processor.

11. The data processing system according to claim 10, wherein the mail box comprises an ownership restoration region, and
the host processor transmits a read command for the ownership restoration region to the memory controller in order to restore the ownership from the processor.

12. The data processing system according to claim 1, wherein the memory controller stores status information of the processor in the mail box, and
the host processor determines whether the processor has completed the second task by reading the status information from the mail box after transferring the ownership to the processor, and restores the ownership from the processor according to the determination result.

13. The data processing system according to claim 12, wherein after restoring the ownership, the host processor reads task result data of the second task from the shared memory through the memory controller.

14. A data processing system comprising:
a shared memory;
a processor configured to process a task by receiving an ownership from a host processor and accessing the shared memory; and
a memory controller coupled among the host processor, the processor, and the shared memory, and configured to allow the host processor or the processor to access the shared memory according to the ownership,
wherein the memory controller comprises a mail box which the host processor accesses in order to transfer the ownership to the processor,
wherein the memory controller comprises:
a control unit configured to give the ownership to the host processor or the processor in response to an access to the mail box by the host processor; and
an interface unit configured to form a path among the host processor, the shared memory, and the control unit, according to control of the control unit,
wherein the control unit controls the interface unit to change the path according to the change of the ownership,
wherein in order to give the ownership to the processor in response to a first access to the mail box by the host processor, the control unit controls the interface unit to form a first data path and first command path between the shared memory and the control unit and to form a second data path between the host processor and the control unit, and
wherein after the ownership is transferred to the processor, the control unit stores task information on the task in the mail box, the task information being transferred through the second data path from the host processor.

15. The data processing system according to claim 14, wherein the processor is coupled to the control unit, and accesses the shared memory through the control unit when possessing the ownership.

16. The data processing system according to claim 14, wherein the control unit transmits transfer check data to the host processor through the second data path in response to the first access.

17. The data processing system according to claim 14, wherein in order to give the ownership to the host processor in response to a second access to the mail box by the host processor, the control unit controls the interface unit to form a third data path and second command path between the host processor and the shared memory.

18. The data processing system according to claim 17, wherein the control unit transmits restoration check data to the host processor through the second data path in response to the second access, and then gives the ownership to the host processor.

19. The data processing system according to claim 14, wherein the processor reads the task information from the mail box, checks the read task information, and processes the task.

20. The data processing system according to claim 14, wherein the processor stores task result data of the task in the mail box, so that the host processor reads the task result data of the task through the second data path.

21. The data processing system according to claim 14, wherein the interface unit and the control unit are coupled to the host processor through a host command path, and receives an access command for the shared memory or the mail box through the host command path.

22. The data processing system according to claim 21, wherein a first address range which does not overlap a second address range assigned to the shared memory is assigned to the mail box from the host processor, and
the control unit processes an access command transmitted from the host processor by comparing an address of the access command to the first address range and the second address range.

23. The data processing system according to claim 14, wherein the mail box comprises an ownership transfer region, and
the memory controller gives the ownership to the processor, when receiving a read command for the ownership transfer region from the host processor.

24. The data processing system according to claim 23, wherein the mail box further comprises an ownership restoration region, and
the memory controller gives the ownership to the host processor, when receiving a read command for the ownership restoration region from the host processor.

25. The data processing system according to claim 14, wherein the memory controller stores status information of the processor in the mail box so that the host processor reads the status information.

* * * * *